(12) United States Patent
Reisswig

(10) Patent No.: US 11,615,246 B2
(45) Date of Patent: Mar. 28, 2023

(54) DATA-DRIVEN STRUCTURE EXTRACTION FROM TEXT DOCUMENTS

(71) Applicant: SAP SE, Walldorf (DE)

(72) Inventor: Christian Reisswig, Berlin (DE)

(73) Assignee: SAP SE, Walldorf (DE)

( * ) Notice: Subject to any disclaimer, the term of this patent is extended or adjusted under 35 U.S.C. 154(b) by 407 days.

(21) Appl. No.: 16/891,819

(22) Filed: Jun. 3, 2020

(65) Prior Publication Data

US 2021/0383067 A1    Dec. 9, 2021

(51) Int. Cl.
*G06F 40/295*       (2020.01)
*G06N 20/20*        (2019.01)
*G06F 16/35*        (2019.01)
*G06F 40/284*       (2020.01)
*G06N 3/04*         (2023.01)
*G06F 40/14*        (2020.01)

(52) U.S. Cl.
CPC .......... *G06F 40/295* (2020.01); *G06F 16/355* (2019.01); *G06F 40/14* (2020.01); *G06F 40/284* (2020.01); *G06N 3/04* (2013.01); *G06N 20/20* (2019.01)

(58) Field of Classification Search
CPC ...... G06F 40/295; G06F 16/355; G06F 40/14; G06F 40/284; G06F 16/93; G06F 16/367; G06F 18/241; G06N 3/04; G06N 20/20; G06N 3/045; G06N 3/08; G06V 10/82; G06V 30/224

See application file for complete search history.

(56) References Cited

U.S. PATENT DOCUMENTS

| 6,772,149 B1 | 8/2004 | Morelock et al. |
| 8,234,312 B2 | 7/2012 | Thomas |
| 10,540,579 B2 | 1/2020 | Reisswig et al. |

(Continued)

OTHER PUBLICATIONS

Bavtalab et al, Multi-Level Fuzzy Min-Max Neural Network Classifier, IEEE Transactions on Neural Networks and Learning Systems, vol. 25, No. 3, Mar. 2014, pp. 470-482 (Year: 2014).*

(Continued)

*Primary Examiner* — Linda Wong
(74) *Attorney, Agent, or Firm* — Klarquist Sparkman, LLP

(57) ABSTRACT

Methods and apparatus are disclosed for extracting structured content, as graphs, from text documents. Graph vertices and edges correspond to document tokens and pairwise relationships between tokens. Undirected peer relationships and directed relationships (e.g. key-value or composition) are supported. Vertices can be identified with predefined fields, and thence mapped to database columns for automated storage of document content in a database. A trained neural network classifier determines relationship classifications for all pairwise combinations of input tokens. The relationship classification can differentiate multiple relationship types. A multi-level classifier extracts multi-level graph structure from a document. Disclosed embodiments support arbitrary graph structures with hierarchical and planar relationships. Relationships are not restricted by spatial proximity or document layout. Composite tokens can be identified interspersed with other content. A single token can belong to multiple higher level structures according to its various relationships. Examples and variations are disclosed.

20 Claims, 13 Drawing Sheets

(56) References Cited

U.S. PATENT DOCUMENTS

| | | | |
|---|---|---|---|
| 2003/0095135 | A1 | 5/2003 | Kaasila et al. |
| 2008/0059945 | A1 | 3/2008 | Sauer et al. |
| 2013/0246480 | A1 | 9/2013 | Lemcke et al. |
| 2016/0179982 | A1 | 6/2016 | Dietrich |
| 2017/0323425 | A1 | 11/2017 | Masuko et al. |
| 2020/0356851 | A1* | 11/2020 | Li .......................... G06F 40/30 |
| 2021/0081717 | A1* | 3/2021 | Creed .................... G06F 17/16 |
| 2021/0209472 | A1* | 7/2021 | Chen ...................... G06F 40/30 |

OTHER PUBLICATIONS

Megumba et al, Ontology boosted deep learning for disease name extraction from Twitter messages, Journal of Big data, 2018, pp. 1-19 (Year: 2018).*

Extended European Search Report for Application No. 21161736.0, 18 pages, dated Sep. 3, 2021.

Harish et al., "Representation and Classification of Text Documents: A Brief Review", IJCA Special Issue on RTIPPR, pp. 110-119 (Feb. 2010).

Knoblock et al., "Interactively Mapping Data Sources into the Semantic Web", pp. 1-12 (purportedly Oct. 2011).

Dharmadhikari et al., "Multi Label Text Classification through Label Propagation", International Journal of Engineering Research and Development ISSN, pp. 9-14 (Jun. 2012).

Palm et al., "CloudScan—a configuration-free invoice analysis system using recurrent neural networks", arXiv.org 1708.07403v1, Cornell University Library, 8 pages (Aug. 2017).

Ramshaw et al., "Text Chunking using Transformation-Based Learning", arXiv.org cmp-lg/9505040v1, Cornell University Library, 13 pages (May 1995).

Rausch et al., "DocParser: Hierarchical Structure Parsing of Document Renderings", arXiv.org 1911.01702v1, Cornell University Library, 14 pages (Nov. 2019).

SAP, "Document Information Extraction", https://help.sap.com/doc/cc96d8c853274be4b58b1d57acbff284/Ship/en-US/ab18043fd70e424dbcbcfd81585ff029.pdf , pp. 1-47 (Mar. 2020).

Stewart et al., "Document Image Page Segmentation and Character Recognition as Semantic Segmentation", Proceedings of the 4th International Workshop on Historical Document Imaging and Processing, pp. 101-106 (Nov. 2017).

Vaswani et al., "Attention Is All You Need", arXiv.org 1706.03762v5, Cornell University Library, 15 pages (Dec. 2017).

Wang et al., "Extracting Multiple-Relations in One-Pass with Pre-Trained Transformers", arXiv.org 1902.01030v2, Cornell University Library, 7 pages (Jun. 2019).

Weng, "Attention? Attention!", https://lilianweng.github.io/lil-log/2018/06/24/attention-attention.html, 28 pages (Jun. 2018).

Wikipedia, "Bert (language model)", downloaded from https://en.wikipedia.org/wiki/BERT_(language model), 3 pages (document marked Apr. 2020).

Wikipedia, "GloVe (machine learning)", downloaded from https://en.wikipedia.org/wiki/GloVe_(machine_learning), 2 pages (document marked Apr. 2020).

Wikipedia, "Softmax function", downloaded from https://en.wikipedia.org/wiki/Softmax_function, 8 pages (document marked Mar. 2020).

Wikipedia, "Transformer (machine learning model)", downloaded from https://en.wikipedia.org/wiki/Transformer_(machine_learning_model), 5 pages (document marked Mar. 2020).

Wikipedia, "Word2vec", downloaded from https://en.wikipedia.org/wiki/Word2vec, 6 pages (document marked May 2020).

Wu et al., "Enriching Pre-trained Language Model with Entity Information for Relation Classification", Proceedings of the 28th ACM International Conference on Information and Knowledge Management, pp. 2361-2364 (Nov. 2019).

Yang et al., "Learning to Extract Semantic Structure from Documents Using Multimodal Fully Convolutional Neural Networks", arXiv.org, Cornell University Library, 16 pages (Jun. 2017).

Alammar, "The Illustrated BERT, ELMo, and co. (How NLP Cracked Transfer Learning)", http://jalammar.github.io/illustrated-bert/, 20 pages (Dec. 2018).

Alammar, "The Illustrated Transformer", http://jalammar.github.io/illustrated-transformer/, 22 pages (Jun. 2018).

Algorithmia, "Introduction to Loss Functions", https://algorithmia.com/blog/introduction-to-loss-functions, 8 pages (Apr. 2018).

Al-Masri, "How Does Back-Propagation in Artificial Neural Networks Work?", https://towardsdatascience.com/how-does-back-propagation-in-artificial-neural-networks-work-c7cad873ea7, 11 pages (Jan. 2019).

Bartz et al., "STN-OCR: A single Neural Network for Text Detection and Text Recognition", arXiv.org 1707.08831v1, Cornell University Library, 9 pages (Jul. 2017).

Benaffane, "Transformer vs RNN and CNN for Translation Task", https://medium.com/analytics-vidhya/transformer-vs-rnn-and-cnn-18eeefa3602b, 12 pages (Aug. 2019).

Bird et al., "Extracting Information from Text", https://www.nltk.org/book/ch07.html, 19 pages (Sep. 2019).

Cheng et al., "Long Short-Term Memory-Networks for Machine Reading", arXiv.org 1601.06733v7, Cornell University Library, 11 pages (Sep. 2016).

Chromiak, "The Transformer—Attention is all you need.", https://mchromiak.github.io/articles/2017/Sep/12/Transfonner-Attention-is-all-you-need/#.XqxyzGhKiUk, 19 pages (Sep. 2017).

Crnoja, "How Automation is Changing Financial Services—SAP Business Entity Recognition", https://blogs.sap.com/2019/12/10/how-automation-is-changing-financial-services/, 8 pages (Dec. 2019).

Denk et al., "BERTgrid: Contextualized Embedding for 2D Document Representation and Understanding", arXiv.org 1909.04948v2, Cornell University Library, 4 pages (Oct. 2019).

European Search Report from EP Patent Application No. 18204940.3, 9 pages (Jun. 24, 2019).

Jaderberg et al., "Reading Text in the Wild with Convolutional Neural Networks", ArXiv.org 1412.1842v1, Cornell University Library (Dec. 2014).

Jiang et al., "Text Classification using Graph Mining-based Feature Extraction", 14 pages, also published as Jiang et al., "Text Classification using Graph Mining-based Feature Extraction", Research and Development in Intelligent Systems XXVI, pp. 21-34 (Oct. 2009).

Nicholson, "A.I. Wiki a Beginner's Guide to Important Topics in AI, Machine Learning, and Deep Learning", https://pathmind.com/wiki/attention-mechanism-memory-network, 12 pages (Dec. 2019).

\* cited by examiner

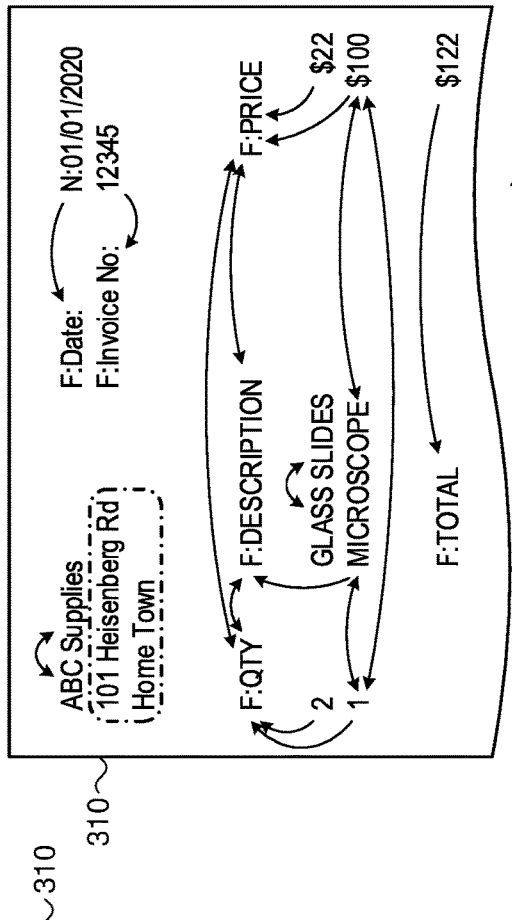
FIG. 3A
FIG. 3B
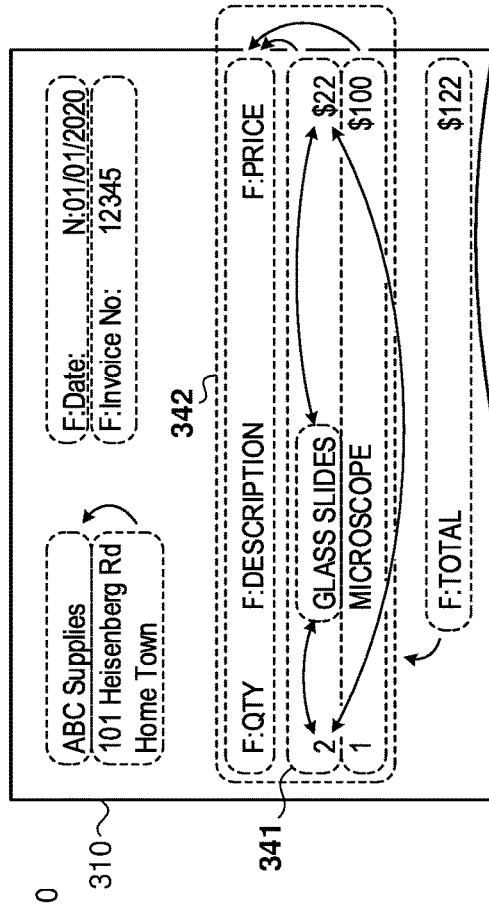
FIG. 3C
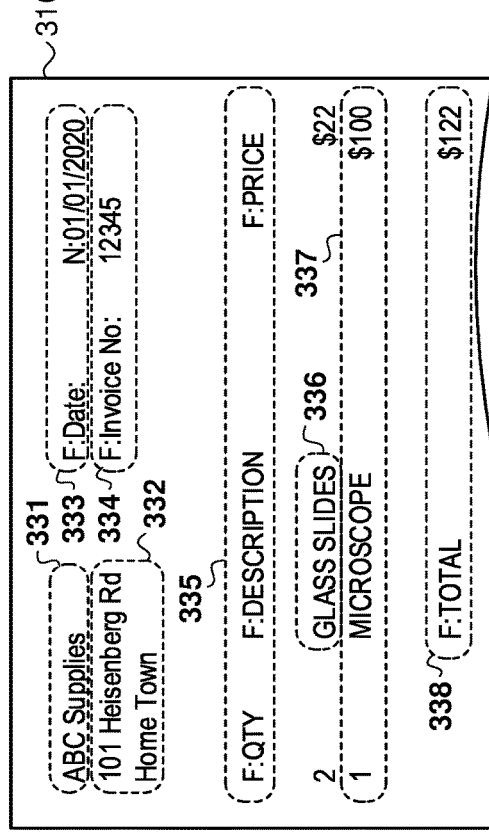
FIG. 3D

| 821 → | SOAKING TIME | 0:20 | |
|---|---|---|---|
| 831 → | DRYING TIME | 0:45 | |
| 841 → | BAKING TIME | 1:15 | |
| 822 → | SOAKING TIME | 0:40 | ⎬ 824 |
| 832 → | DRYING TIME | 0:53 | |
| 842 → | BAKING TIME | 2:25 | |

| 823 → | TOTAL SOAKING | 1:00 | TOTAL DRYING | 1:38 | ← 833 |
|---|---|---|---|---|---|
| 843 → | TOTAL BAKING | 3:40 | GRAND TOTAL | 6:18 | ← 853 |

FIG. 8A

| 821 | (SOAKING TIME) ~825 | 0:20 | |
|---|---|---|---|
| | 861↕ | | |
| | 826 | | ⎬ 824 |
| 822 | (SOAKING TIME) | 0:40 | |
| | 862 | | |
| | 863 | | |

| 823 | (TOTAL SOAKING) | 1:00 | | 855 | | |
|---|---|---|---|---|---|---|
| | 827 | 865 | (GRAND TOTAL) | 6:13 | 853 |

DATA-DRIVEN STRUCTURE EXTRACTION FROM TEXT DOCUMENTS

BACKGROUND

A wide range of human endeavors rely on documents. As the years go by, databases grow in scale and continue to penetrate into new applications. Many aspects of database technologies have seen improvements to accompany this evolution, however a basic problem of capturing document content (unstructured) into databases (structured) remains a challenge. Optical recognition has aided conversion of human readable documents into machine readable form, but does not seek to recognize or organize the content of document text. In some domains, e.g. standardized test answer sheets, bank checks, or tax returns, human-readable documents are forced into a standard format so that machine readable characters can be accurately assigned to predefined document fields. In other applications, conventional technologies can address simple tasks, such as parsing the grammar of a single sentence, or recognizing the fields of a single fixed document format. However, documents of a single class can vary considerably in format, according to the document provider, over time, or due to other factors. Additionally, conventional technologies can have difficulty recognizing structure beyond the simplest tables, or managing situations where a single token can have multiple relationships with peer tokens or larger entities. Thus, with conventional technology, even simple issues can require a significant amount of manual effort for data entry, or can require customized automation for each different document style. Accordingly, there remains a need for improved technologies for reliable, flexible, automated extraction of structured content from documents.

SUMMARY

In summary, the detailed description is directed to various innovative technologies for determining structure in a text document. In examples, a neural network can be trained to evaluate respective relationship statuses for all pairwise combinations of tokens in the document. Input to the neural network can be a sequence of vectors representing respective tokens of the text document. Output from the neural network can be a corresponding sequence of vectors for the tokens, with the $j^{th}$ component of the $i^{th}$ vector indicating a relationship status between the $i^{th}$ and $j^{th}$ tokens. Multiple layers of neural networks can be used to build up the document structure in a hierarchy of levels. The structure extracted from the document can be used to map tokens of the input document to columns of a database, allowing automated transformation of unstructured document content to a structured representation in a database.

In certain examples, the disclosed technologies can be implemented as computer-readable media storing instructions which, when executed by one or more hardware processors, cause the hardware processors to perform the following actions. At training time, multiple training records are obtained for respective text documents. Each training record has one or more input features representing unstructured content of the respective text document, and training labels which are one or more training graphs. The training graphs describing relationships among the unstructured content of the respective text document. A machine learning classifier is trained on the training records. At run time, a record representing unstructured content of an input document is obtained. The record is inputted to the trained machine learning classifier to determine a structure graph of the input document. A given level of the trained machine learning classifier has inputs representing N tokens of the input document and outputs representing $N \cdot (N-1)/2$ pairwise combinations of the N tokens. One or more of the outputs define corresponding edges of the structure graph.

In some examples, obtaining the input document record can include preprocessing an original form of the input document by recognizing at least one field in the input document as a named entity and replacing the recognized field(s) in the input document with the named entity. Obtaining the input document record can include tagging the record with positional encoding information. The edges of the structure graph can include a first directed edge indicating a key-value relationship between a first pair of the tokens, and a second undirected edge indicating a peer relationship between a second pair of the tokens. The edges of the structure graph can include three or more undirected edges forming a cycle.

In additional examples, the training graphs of a given training record can describe a hierarchy of relationships among two or more levels of entities of the respective text document. The levels can include first and second levels. During training, a first loss function can be applied to train the given level of the machine learning classifier to identify relationships at the first level. A second loss function, different from the first loss function, can be applied to train the machine learning classifier to identify relationships at the second level. The machine learning classifier can be a first classifier whose output is a first structure graph. In further examples, a second machine learning classifier can be trained to identify relationships, at a second level of the levels, among first composite tokens grouped by their identified first-level relationships. At run time, a first-level composite token, which can represent a group of the tokens based on the first structure graph, can be identified. The group of tokens can be replaced with the first-level composite token to obtain a second-level record. The second-level record can be inputted to the trained second machine learning classifier to determine a second structure graph of the input document. The first and second structure graphs can be merged to form a multi-level graph of the input document.

In further examples, the operations can also include mapping multiple vertices of the structure graph to respective columns of a database, adding one or more records to the database for the input document and, for each of the mapped vertices, storing a value representing content of the input document in the respective column of the added record(s).

In certain examples, the disclosed technologies can be implemented as a computer-implemented method for extracting a graph structure of a text document. The text document is preprocessed to generate an initial input record comprising a sequence of input vectors representing respective tokens of the text document. At each of multiple levels, a respective input record is processed with a respective neural network to generate a portion of the graph structure. The input record at an initial level is the initial input record. For each level except the initial level, the respective input record is derived from the input record for an immediately preceding level of the levels and the portion of the graph structure generated at the immediately preceding level. The graph structure is outputted.

In some examples, each vertex of the graph structure can represent a single token or a group of multiple related tokens. The represented token(s) can define a value. Each edge of the graph structure can represent a relation between a pair of the vertices joined by the edge. A record for the text document can be added to a database table. For each of multiple vertices, a column of the database table can be identified. The value defined by the token(s) represented by the each vertex can be stored in the record, at the identified column.

In additional examples, the neural network at a given level can output a sequence of output vectors for respective tokens. Components of each output vector can identify relationships between the respective token of that output vector and the respective tokens of other output vectors. The sequence of the output vectors can define the portion of the graph structure at the given level. A first level can immediately precede a second level. The portion of the graph structure defined at the first level can include an edge joining first and second vertices of the graph structure, respectively representing first and second tokens. The input record for the second level can be derived by incorporating a union vector representing a union of the first and second tokens into the input record for the second level.

In certain examples, the disclosed technologies can be implemented as a system having one or more hardware processors, with memory coupled thereto, and computer-readable media storing executable instructions for responding to a request by performing the following operations. A structure graph of a received text document is extracted using a trained machine learning classifier. The structure graph includes multiple vertices having respective values defined by content of the received text document. The vertices are mapped to columns of a database. For each of the vertices, the respective value of that vertex is stored in the database.

In some examples, the system can include a database management system storing the database. The trained machine learning classifier can be a multi-level classifier. Each level of the multi-level classifier can be configured to generate a corresponding level of the structure graph. A given level of the multi-level classifier can include a transformer neural network. The transformer neural network can be configured to receive inputs representing N tokens of the received text document and further configured to generate outputs representing $N \cdot (N-1)/2$ pairwise combinations of the N tokens. At least one of the outputs can define an edge of the structure graph.

The foregoing and other objects, features, and advantages of the invention will become more apparent from the following detailed description, which proceeds with reference to the accompanying figures.

BRIEF DESCRIPTION OF THE DRAWINGS

FIGS. 3A-3D are diagrams illustrating processing of a first document according to an example of the disclosed technologies.

FIGS. 8A-8B are diagrams illustrating processing of a third document according to an example of the disclosed technologies.

DETAILED DESCRIPTION

Introduction

Figure 1:
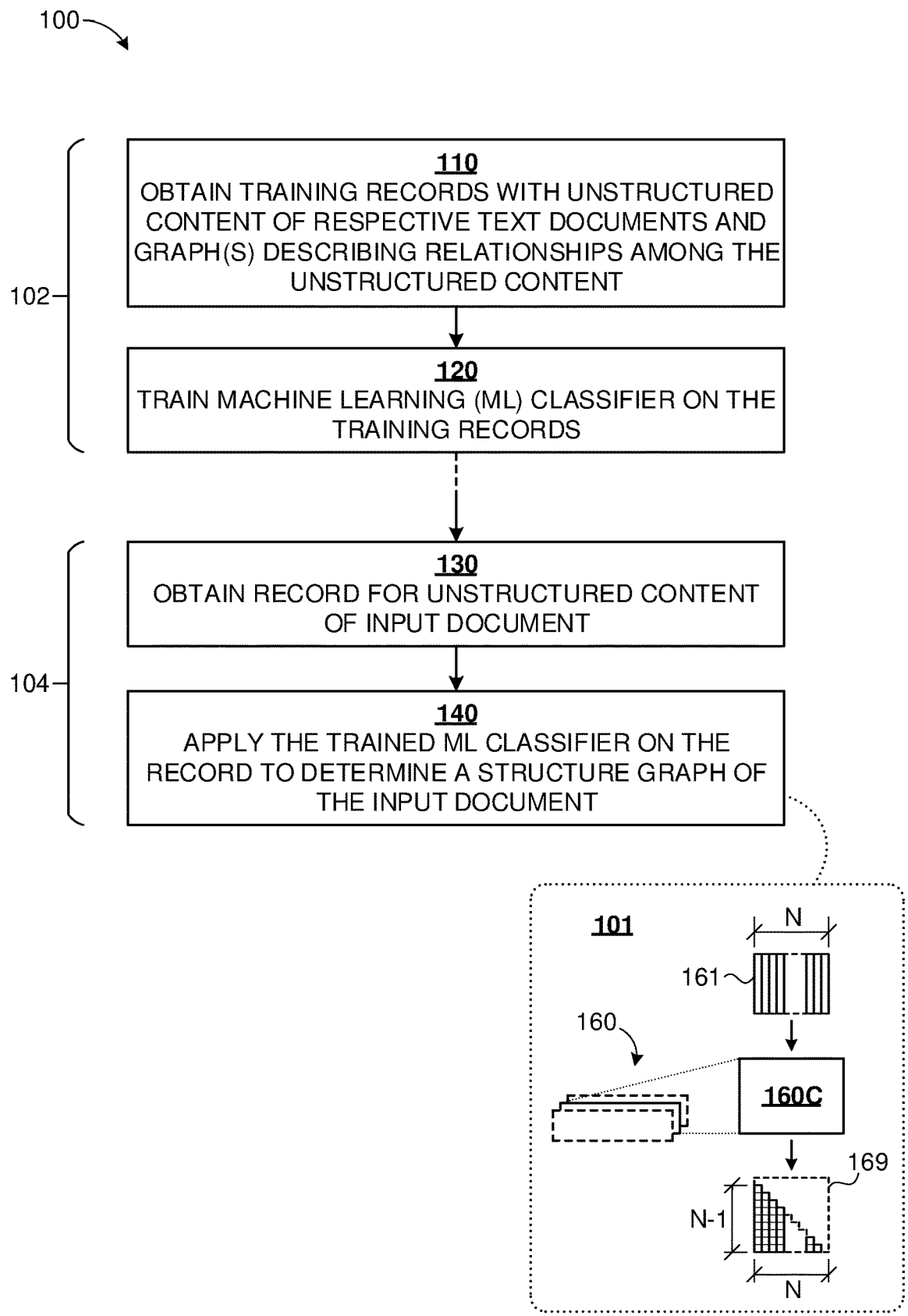
FIG. 1 is a flowchart of a first example method for determining a structure of a text document according to the disclosed technologies.

The disclosed technologies approach content extraction by applying classification techniques to pairwise combinations of text tokens in a document. That is, given N tokens, classifiers can directly target all pairwise combinations (i.e. $N \cdot (N-1)$ directed pairs or $N \cdot (N-1)/2$ undirected pairs) for classification. That is, for each token input to a disclosed classifier, distinct output labels can be generated indicating whether there is or isn't a relationship with each of the other input tokens. Every relationship can be regarded as an edge of a corresponding structure graph, connecting two vertices representing the corresponding related tokens. A simple classification can be presence or absence of a relationship, but more complex relationship classifications can also be advantageously employed, as described further herein. This approach, namely classifying pairwise combinations of tokens, contrasts with existing sequence tagging or other parsing techniques that seek to assign classifiers (e.g. noun, verb, preposition, adjective) to the tokens themselves.

Further, the disclosed approach can use an extracted graph to map content to particular fields (e.g. Document Date, Provider Name, Table Header) that may be predefined for the document. For example, a relationship between a date string (e.g. "01/01/2020") and a keyword ("Date") can be recognized as a key-value pair for a date, which can then be mapped to the Document Date. That is, the disclosed approach supports discovery of structured content using a graph→structured content paradigm. This also contrasts with existing technologies that may use an opposite paradigm of structured content→graph. That is, in a conventional approach, structured content (e.g. subject noun, verb, object noun) can be determined first, and used to build the graph (e.g. predicate=verb→object; sentence=subject→predicate).

Because the computational problem of evaluating $O(N^2)$ combinations is inherently quadratic, the disclosed technologies can apply a variety of techniques to obtain computational efficiency. As one example, it can be seen that a given token can be a member of up to N−1 token pairs, and therefore associated with up to N−1 output labels. These N−1 output labels can be grouped into an output vector for the given token, and similar output vectors can be formed for each of the other tokens. That is, the $O(N^2)$ individual labels can be aggregated into N output vectors. Inasmuch as text input is commonly presented as one vector for each token (e.g. using word embedding), a neural network for the pairwise classification task can have N input vectors and N output vectors, and can maintain a uniform width (N) throughout. Accordingly, weight matrices can scale as N×N rather than N×N$^2$ or N$^2$×N$^2$, as could be required if the N·(N−1) output labels were independently generated. Further efficiency can be achieved by consolidating the relationships to N·(N−1)/2 pairwise combinations, as described further herein, which can directly reduce the required computation by a factor of two.

The disclosed technologies can be also be organized in a hierarchical manner, recognizing low-level groups of related tokens first, and then further groups of the low-level token groups. That is, graph extraction can be performed on multiple levels, with the structure determined at one level fed as input to a next higher level of a classifier. In an example of a table, words of a table field can be recognized as a group of related tokens at level one, the table field can be grouped with other fields of its row into a Line Item at level two, and several Line Items can be grouped with a Table Header at level three, to recognize a complete Table as structured content from the original document.

As described further herein, the presence of multiple levels provides additional computational benefits, allowing higher (later) levels to be performed on relatively short input records, i.e. with considerably fewer than the N tokens of the original document. At the same time, the presence of higher levels means that not all relationships (particularly, long-distance relationships) need to be extracted at level one, or even at level two. The lower levels can be restricted in the number of pairwise combinations that are evaluated, while the multi-level classifier can retain the capability to determine output labels for all pairwise combinations of the N tokens. Multi-level organization of output structure graphs and classifiers can also provide a training benefit, as each level of a multi-level classifier can be trained independently, efficiently, and precisely to perform graph extraction tasks for its given level.

The disclosed technologies permit previously unattainable flexibility as regards both inputs and outputs. A given machine learning (ML) classifier can be trained on any of widely disparate document types—process logs, network logs, manufacturing route sheets, airline tickets, invoices, newspaper articles, and more. Human effort can be restricted primarily to providing a modest corpus of training data for different classes of documents Minimal software reconfiguration is required, e.g. for operations such as setting the maximum number of tokens in a document, or selecting the right named entity libraries or word embedding ontology for a given application. The classifier itself can run "out of the box," without customization of the classifier code. Furthermore, depending on the application, input tokens at level one of a classifier can variously be characters, words, sentences, or sections of a document. As regards output, the structure graphs are not limited to being either planar graphs or trees. The disclosed technologies can support multi-level hierarchies of content structure, concurrently with planar subgraphs relating tokens within a given level. Still further, a single token (either a simple token at level one, or a composite token at a higher level) can, in some instances, be a member of multiple higher level structures, without restriction.

Moreover, the disclosed technologies can be fully data-driven, and can capture a wide variety of relationships within documents without the need for creating rules. Rules can require domain expertise to configure, can be limited to documents having specific organization of content, and accordingly can be difficult to maintain. By avoiding hard-coded rules, the disclosed technologies can provide robust structure extraction and, with suitable training, can accurately evaluate documents of previously unseen formats. Examples of the disclosed technologies can have preprocessing modules embedded within a structure extraction tool, and can be trained end-to-end with raw text documents as input and a structure graph as output. That is, the capabilities of a disclosed structure extraction tool can be entirely driven by the training data.

By focusing on the structure graph, and explicitly learning the relations between tokens, the disclosed technologies have succeeded in improving the accuracy and quality of semantic understanding from text documents. With the disclosed technologies, it can be practical to train neural networks to extract a rich data structure covering tokens and groups over multiple levels of a document.

To summarize, the disclosed technologies provide improvements to the state of the art in the following aspects. First, arbitrary graph structures can be determined over all tokens of a document. This enables extraction of complex relationships and structures, independent of where any given token is located. Conventional techniques can be limited to only the specific structures (e.g. sentence syntax) for which they are designed, or can be limited to only specific fields constrained to be in respective predefined locations. Second, multiple graphs can be extracted over a single document. Particularly, multi-level extraction is efficiently supported and well suited to documents having an inherently hierarchical structure. Third, the grouping of tokens is not restricted to spatial neighborhood since the graph approach can relate any token with any other token of an input record. To illustrate, conventional approaches using input-output-beginning (JOB) tagging or a bounding box cannot handle commonly found tables having interleaved records. That is, the bounding box for one content structure may contain extraneous text from a different content structure. The present approach has no such limitation, and can easily detect relationships that skip lines, go from top to bottom of a page, or even across pages. That is, components of a composite token can be scattered throughout a document. Fourth, the disclosed approach is readily applicable to any document type, in any language. The disclosed technology supports extraction or identification of any specific or generic key-value pair, table, or predefined document fields or structures.

The disclosed technologies are not limited to a particular implementation. In brief, examples of the present disclosure are concerned with a task of determining a graph among tokens of a document. Some examples herein are described in terms of transformer neural networks, which are well suited in certain aspects to this task; however, other classifiers, such as convolutional or recurrent neural networks can also be configured along the lines disclosed herein. Even a linear sequence tagger can be configured or trained, with some software modification, to generate pairwise classifications instead of individual token classifications.

Terminology

The usage and meaning of all quoted terms in this section applies throughout this disclosure unless clearly indicated otherwise or repugnant to the context. The terminology below extends to related word forms.

The term "add" refers to joining one or more items with one or more like items, or incorporating the one or more items into a group of such items. The group can initially be empty. Particularly, a vertex or edge can be added to a graph, a record can be added to a set of records or a data table, a field can be added to a record, a column can be added to a table, a data table can be added to a database, and so forth. Two sets or other groups of items can be added together to form a larger set or group of items.

"Attention" is a mechanism in an ML tool for identifying portions of an input that have relevance to portions of a query. "Self-attention" is a variant where the query and the input are the same. That is, self-attention can identify portions of an input that have relevance to other portions of the same input.

A "classifier" is a tool or rule for assigning one or more classes (dubbed "labels") to a finite data input. Data input to the classifier can be a single data item or a collection of data items, such as a document, a page of a document, or features extracted therefrom. The features can be a sequence of vectors representing document tokens. Some classifiers described herein are machine learning (ML) classifiers, and can be implemented as deep neural networks (DNN), including transformer neural networks (TNN), convolutional neural networks (CNN), or recurrent neural networks (RNN).

A "client" is a hardware or software computing entity that uses a resource provided by another hardware or software computing entity dubbed a "server."

The term "content" refers to one or more tokens in a document conveying semantic meaning. Content can be structured or unstructured. "Unstructured content" can be present in a raw form of a document often suitable for visual presentation, in which content tokens are present, but the relationships between them are not explicit. Tokens of unstructured content can have positional or other attributes that can help a human reader discern such relationships. Such attributes can include proximity (e.g. "glass" adjacent to "slide" being understood as a "glass slide"), position within a document (e.g. "2" at the bottom of a page can be understood as a page number, while a "2" in a table can be an indicator of a line number), or font (e.g. bold face can be understood as a section header or table header). Examples of the disclosed technologies are concerned with extracting such relationships between content tokens, e.g. in the form of a graph. Such a graph can be used to convert unstructured content to structured content. "Structured content" is a combination of (unstructured) content tokens with the relationships between them. Structured content can be in the form of a graph, with vertices representing content tokens and edges between vertices representing relationships between the associated tokens. Structured content can also include identification of tokens with predetermined fields (e.g. Document Date, or Provider Name), and can be suitable for automated incorporation into a database.

The term "database" refers to an organized collection of data maintained on computer-readable media and accessible by execution of instructions at one or more processors. Databases can be relational, in-memory or on disk, hierarchical or non-hierarchical, or any other type of database. Some databases of interest in this disclosure are organized as "records", each record being a collection of fields having respective values. The fields of two records can be the same, while the corresponding values can be the same or can vary between records. In some examples, records can be organized as rows of a table, with like fields of the records forming a corresponding column of the data table. In varying examples, the specific organization of the table can differ, e.g. rows and columns can be swapped, or the table can be organized as a multi-dimensional array. Regardless of the physical or logical organization of the records or table, a "row" denotes one record, and a "column" denotes a collection of like fields (which can have varied values) over a collection of one or more records.

Two items or operations are considered "distinct" if they are not the same item or operation, even if they are identical. Two data items (including documents) are considered "identical" if the content of one cannot be distinguished from the content of the other. Two identical data items can have distinguishable metadata, such as filenames, storage locations, or timestamps. Two operations are considered identical if the actions of one cannot be distinguished from the actions of the other in any situation. Two items or operations are considered "different" if they are not identical.

A "graph" is a set of two or more vertices and a set of one or more edges joining respective pairs of the vertices. The edges can be directed or undirected. A directed edge can indicate, without limitation, one vertex being dependent on, a part of, or a property of another vertex, and can indicate a directional relationship which can be represented with a single-ended arrow. An undirected edge can indicate, without limitation, two vertices having a peer relationship with each other (whether of same or different types), and can indicate a bidirectional relationship which can be represented with a bidirectional arrow or an arrow-free line. A graph representing the structure of content in a document can be dubbed a "structure graph" of the document. A graph in which a path exists between every pair of vertices is a "connected graph." A graph in which at least one pair of vertices has no connecting path is a "disjoint graph." The graphs described herein are often disjoint graphs. In some examples herein, disjoint subgraphs of a document can represent various top-level entities present in the document. Each such top-level entity can be connected to a root vertex representing the entire document to form a connected structure graph of the document. A pair of vertices joined by an edge can be described as "directly coupled." A set of vertices in which all pairs of vertices are directly coupled is "fully connected." A path following successive edges from one vertex to another that returns to the original vertex without traversing any vertex or edge more than once is a "cycle." Two vertices V1, V2 can form a cycle if there are distinct directed edges V1→V2 and V1←V2; otherwise a cycle requires three or more vertices and three or more edges. A graph is a logical structure and can be implemented using any of various types of data structures to track vertices and edges (e.g. arrays or linked lists). A graph or a graph data structure can be a model of a document and can indicate relationships between content tokens therein.

The term "hierarchy" refers to a structure of data items or operations organized in levels, with data items or operations at a lower level feeding into or linked to data items or operations at a higher level. The structure extracted from a document can be organized as a hierarchy, with low level simple tokens, and higher level composite tokens, as described herein. Items at a given level of a hierarchy can have relationships (links, edges) among themselves, in additional to relationships with items at other levels. Thus, while a hierarchy can be a tree (all edges joining vertices at different levels), some common hierarchies of document structure encountered herein do have same-level edges and are not trees.

As used herein, the term "level" refers to successive stages of classification, particularly in the context of structure extraction from a document. As described further herein, a first level of structure can be extracted from simple tokens using a first level classifier. A second level of structure can be extracted from simple and composite tokens using a second level classifier, and similarly for successive higher levels. The term level can apply to the classifier, the classification process, or respective inputs or outputs. A given level of classification can be performed by a corresponding neural network, which can be one or more layers of neuron cells. Thus, the terms level and layer are used distinctly although, in some examples, one level of a classifier can have exactly one layer of neuron cells.

A "loss function" is a measure of distance between an actual output of an ML tool and a desired output (e.g. a so-called correct answer). That is, the loss function takes as input an output label of the ML tool and a corresponding training label, and returns a numerical result according to the distance or difference between the output label and the training label. Commonly, a result of zero indicates a perfect match between the actual output and the training label, and increasing (positive) values of the loss function indicate greater distance between the actual output and the training label, but this is not a requirement, and other numerical scales can be used. The numerical result can be a scalar quantity or a multi-dimensional quantity. For example, where the output label is a vector, the loss function can return a vector of results, with one result for each respective component of the output vector. Where the output label is a sequence of vectors, the loss function can also be a sequence of vectors. A loss function can be used in conjunction with an optimization function to compute adjustments to weights (coefficients) of a neural network or other ML tool, e.g. by backpropagation. Further, a given loss function can be targeted to a given level of a hierarchical classifier, without affecting weights of other levels. Loss functions can even be targeted to specific layers within a given level of the classifier. That is, multiple loss functions or optimization functions can be used to train respective levels of disclosed neural networks. In some examples of the disclosed technologies, a cross-entropy loss function can be used. Particularly, a multi-class cross-entropy loss function can be used to simultaneously train multiple heads of a multi-headed self-attention layer of a transformer neural network, using backpropagation.

The term "machine learning" (ML) is used to characterize a tool, implemented by software in a computing environment, having a particular task for which its performance can improve from experience without being explicitly programmed with any attendant improvements in logic. "Training data," often comprising inputs and corresponding correct or desired outputs, refers to a corpus of data with which an ML tool can improve its performance for the particular task, and "training" refers to a process for improving the performance of the ML tool. The qualifier "trained" indicates that an ML tool has undergone training to attain at least a threshold level of performance, but does not preclude further training of the ML tool. Common ML tools in this disclosure can be classifiers and can be implemented as neural networks, but these are not requirements. Other ML tools can perform other tasks such as regression, prediction, or factor analysis; and numerous other ML implementations exist even for classifiers—including, without limitation, sequence taggers, random forests, k-nearest neighbors, and support vector machines. Inputs to an ML tool can be dubbed "features." In some examples described herein, a feature can be a vector or other data structure representing a token of a text document, and the input to an ML tool can be a sequence of such features (vectors) dubbed an "input record." An output from a classifier can be dubbed a "label." In some examples described herein, a classifier can generate up to $N \cdot (N-1)$ output labels indicating a respective relationship status between every pair among N input tokens. These output labels can be organized as N output vectors as described herein, for a 1:1 correspondence with the N vectors that are input to the classifier.

The term "map," as a verb, refers to forming an association between entities. In some examples described herein, a token (e.g. "DEF Laboratory") can be mapped to a predefined field (e.g. Provider Name) for a document or document class. In further examples, a vertex of a structure graph (e.g. a vertex for Provider Name) can be mapped to a corresponding column of a database table. As a noun, "map" refers to a set of such associations. Often, items associated in a map can be of different types, such as a token, a field of a document, and a column of a database.

The term "merge" refers to an operation on two or more graphs that combines the vertices and edges of the graphs being merged. That is, if $Gi=(Vi, Ei)$ for $i=1:N$, where Vi, Ei are the vertices and edges, respectively, of graph Gi, and N is the number of graphs being merged, then the resulting graph $Go=(Vo, Eo)$ has $Vo=V1 \cup V2 \cup \ldots VN$ and $Eo=E1 \cup E2 \cup \ldots EN$, where $\cup$ is the set union operation. Merging can equivalently be denoted as $Go=G1 \cup G2 \cup \ldots GN$.

A "named entity" is a term of art referring to a word or sequence of words having a specific meaning in a knowledge domain. Knowledge domains of interest in this disclosure include various commercial, manufacturing, or scientific domains, and various classes of documents encountered therein. In some examples of the disclosed technologies, named entities can be recognized from tokens in a document. A named entity having a specific meaning does not preclude it from having additional distinct specific meanings in the same knowledge domain. That is, multiple named entities in a given knowledge domain can be represented by the same text. Named entities can be aggregated with other named entities or tokens into "compound named entities." Other uses of the word "entity" are according to its plain English meaning.

A "neural network" is an artificial network of "units" (or "cells") that has linkages modeled on behavior of biological neurons and can be implemented by a software program on a computer. Some neural networks described herein are "deep neural networks" (DNN) which have two or more intermediate layers between an input layer and an output layer. Some DNN described herein can have 12 or more intermediate (or, "hidden") layers. Some neural networks described herein can be "transformer neural networks" (TNN) which can determine classifications among any pair of input features, i.e. independent of the spacing between the input features. In contrast, common implementations of recurrent (RNN) and convolutional (CNN) neural networks with L layers are limited to evaluation of pairs spaced apart by at most about L or $2^L$ positions of an input sequence. Two neural networks can be stacked to form a (deeper) neural network. Conversely, a contiguous subset of layers of a neural network is also a neural network.

"Recognition" refers to identifying a token or other object as an instance of a predefined field or other object. In a structure graph, a token (e.g. key-value pair "Date" and "01.01.20" or peer group "DEF Laboratory") can be recognized as a predefined field (e.g. Document Date or Provider Name). Another form of recognition is named entity recognition, which refers to identifying a token (e.g. "01.01.2020" or "John") as a predefined named entity (e.g. a date or a male name).

The term "pairwise combinations" refers to pairs selected from a set of objects. In some examples a pair can be a set, in which the order does not matter, so that (A, B) and (B, A) are identical. In other examples, a pair can be a tuple, in which the order matters, so that (A, B) and (B, A) are distinct pairs.

"Positional encoding" refers to tagging a token of a document with an indicator of its spatial position in the document as rendered for viewing. The spatial position can be one-, two-, or multi-dimensional. A one-dimensional position can be along a linear sequence of the tokens so that, for example, if the last token on a given line is assigned #50, the first token on the next line can be #51. A two-dimensional position can include coordinates in two dimensions of a document page. For example, a horizontal position can be represented by a distance (e.g. 2.5 inches) from a left edge of the page, while a vertical position can be represented by a distance or by a line number. The coordinates can indicate the position of the centroid of the token, or a top-right corner of the token, or another fiducial. Use of the centroid can be advantageous for composite tokens. Multi-dimensional position can include, for example, a page number as a third coordinate, or a volume number as a fourth coordinate. Multi-dimensional encoding can also be used for documents organized as sections. To illustrate, section (I)(C)(2) can have respective coordinates 1, 3, 2 for successive depths of the section numbering.

"Preprocessing" refers to operations applied to a received text document to prepare an input record for a classifier. Exemplary preprocessing operations can include, without limitation, optical character recognition (OCR), token extraction, word embedding, named entity recognition (NER), positional encoding, or other metadata encoding. Preprocessing operations can also include discarding certain items within the document, including non-text items (e.g. pictures, or separator lines), or some text items (e.g. a logo, header or footer text, or stop words).

In the context of queries and corresponding responses, the terms "receive" and "transmit" refer to communication over a network, which can be in the form of a message. The communication can be electromagnetic, e.g. over wired, wireless, or optical media, but this is not a requirement.

The term "record" refers to a collection of data fields having respective values, and is used in different contexts. In the context of a classifier, a record can be an input record (e.g. a sequence of features to be classified) or an output record (e.g. one or more output labels). In some examples, an output record of one level or layer of a classifier can be an input record of a following level or layer of the classifier. In the context of training, a training record can include both the input record and the desired output label(s). In the context of a database, a record can be a row of a database table, with the fields of the record containing respective values for the columns of the database table.

In the context of document structure, a "relationship" is a property of a pair of tokens or other data items indicating a direct association between the pair. Relationships can be directed or undirected. Undirected relationships can be peer relationships, such as tokens "Main" and "Street" that are constituent parts of a larger token such as a Provider Address "23 Main Street," or page numbers "1," "2," "3" of successive document pages. Directed relationships can indicate key-value pairs, such as "Invoice No." and "12345," or a relationship of composition, where each of "23," "Main," and "Street" are parts of a Provider Address "23 Main Street." A "relationship status" can indicate whether or not a relationship is present or has been detected. That is, a pair of tokens can have a relationship status in the absence of a relationship. In some examples, relationship status can be a binary variable (e.g. "present," or "absent;" or alternatively "detected," or "not detected"), while in other examples, a relationship can be selected from multiple values, which can even indicate a precise code for the relationship. For example, relationship status "0" can denote no relationship, "11" can denote a peer relationship, "20" can denote a generic key-value relationship, "21" can denote a relationship as a value of a table header key, "22" can denote a key-value relationship of a Document Date object, and so forth. Relationship codes supporting more than one relationship state (in addition to absence of a relationship) are dubbed "multi-valued relationship codes."

A "sequence" is an ordered collection of data items. In some examples described herein, a classifier can receive a sequence of vectors (e.g. representing tokens of a document) as input and can generate another sequence of vectors (e.g. representing relationships among the document tokens) as output.

"Software" refers to computer-executable programs or instructions and associated data structures. Software can be in active or quiescent states. In an active state, software can be loaded into memory or undergoing execution by one or more processors. In a quiescent state, software can be stored on computer-readable media, awaiting transmission or execution.

A representation of a body of text is said to "span" the input text if all tokens of the input text, except those tokens belonging to some disregarded classes of tokens, are accounted for in the representation. The representation can be in the form of a graph (e.g. a structure graph) or in the form of text (e.g. the original text), but this is not a requirement. An input record to a classifier, which can be a preprocessed version of an input document, can also span the document.

A "table" is a two-dimensional array organized into rows (e.g. records) and columns (e.g. fields). A table can be a database table, or a tabular array of content in a source document. Commonly, a row can be a record pertaining to an instance of some class of objects represented in the table, and a column can pertain to a particular property of those objects. A field at the k-th column of the m-th row can store a value of the k-th property for the m-th object. However, while such table organization can be useful for illustration, it is not a requirement of the disclosed technologies, and other organizations and representations can be used, both for databases and for documents. A database table can have relational links, such as shared columns, with other tables. In examples, a database table can be a row store table accessed through an associated index structure or a column store table. A document table can have other forms of organization (e.g. presented in an outline format, or with each row spread over multiple lines, or an irregular form).

The term "tag," as a verb, refers to associating a qualifier or property with a data item. As a noun, a "tag" is the qualifier or property being associated with the data item. In varying examples, a tag can be included within the data item, appended to the data item, or stored as metadata. A metadata tag can be stored with the data item, or in a separate data structure or storage location.

A "text document" is a document including representations of words (e.g. "microscope"), or printable characters (e.g. "01.01.2020"), which convey semantic meaning. A document can be a physical piece of paper, another tangible medium, or an electronic document. An electronic document can be in a proprietary or standard format such as portable document format (PDF), a FAX or scanned copy of a document, a word processor file, a database entry, or a plain text file. An electronic document can be stored in memory or on a storage device, with suitable encoding, and can also be encrypted. A text document can include non-textual content, such as images other than images of text, however the technologies described herein are generally concerned with the text content of a document. A text document can be regarded as belonging to a class. Some exemplary classes can include: lab records, invoices, or weather reports. An example of the disclosed technologies can be a classifier suitable for a particular class of document, which can co-exist with classifiers for other classes of documents.

A "token" is a data item representing one or more portions of a body of text such as a document. Commonly, a "simple token" can represent a word or other sequence of printable characters delimited by whitespace or punctuation, however this is not a requirement. Some tokens (e.g. dates or hyphenated names) can represent character strings which include certain punctuation symbols. Some tokens can represent a named entity recognized in document text. Some tokens can represent combinations of words or other smaller tokens. In some examples, two or more word tokens (e.g. "DEF" and "Laboratory") can be aggregated to form a "composite token" representing a complete Provider Name ("DEF Laboratory"), as described further herein. Tokens can be successively aggregated in a hierarchical manner to represent larger portions of structured content from a document, such as a Line Item or Table. Composite tokens can also represent a section or page of a document, or even the entire document. A token can have a value which is based on or equivalent to the original text represented by the token. A composite token can have a value derived from or containing the values of its constituent tokens. Because a composite token is often mapped to a predefined field for a document (e.g. in a document schema), the term field is often used interchangeably with composite token.

A "vector" is a one-dimensional array of data items. The term "component," used without qualification, refers to an individual data item in a vector, however the qualified term can be used in other contexts, such as hardware or software components. In some examples described herein, a token of a text document can be represented as a vector, using e.g. a word embedding technique. The vector can also include positional encoding information or other metadata describing the token, either as additional components of the vector or superposed on or otherwise combined with other components of the vector.

"Word embedding" refers to procedures, tools, or technology for representing words or other simple tokens as vectors (or other data structures) based on their semantic meaning. That is, a pair of words with similar meaning (e.g. "big," "large") will be closer in the embedding vector space than a pair of words with divergent meaning (e.g. "pickle," "car"). Word embedding can advantageously provide a relatively compact representation of a word that is suitable for training an ML tool, so that the tool is more easily trained to give the same or similar output for input words that are closely related in meaning but can have completely unrelated spellings. In some examples, "contextual" word embedding can also be used to resolve, based on context, which of several meanings is appropriate for a given word (e.g. "lead" as a verb, or "lead" as a metal material). In varying examples of the disclosed technologies, word embedding can be implemented as a separate tool, or as one or more layers within a neural network classifier for document structure extraction.

A "word" is a basic unit of human language, having one or a finite number of semantic meanings that are absent in smaller portions of the word.

First Example Method

FIG. 1 is a flowchart 100 of a first example method for determining a structure of a text document. In this method, an ML classifier is trained on a corpus of training data, and the trained classifier is used to extract a structure graph with indications of pairwise relationships between pairs of document tokens.

At process block 110, multiple training records can be obtained for respective text documents. Each training record can have two or more input features representing unstructured content of the respective text document and one or more graphs as output labels. The graphs can describe relationships among the unstructured content of the respective text document. That is, the graphs can be used to train a neural network or other classifier to extract structure from the unstructured content of a text document. At process block 120, an ML classifier can be trained on the training records. Blocks 110, 120 can be part of a training phase 102.

Subsequently, at runtime, a record representing unstructured content of an input document can be obtained at process block 130. For example, a client can request that structured content be extracted from the input document, and the input document can be preprocessed to obtain the input record representing the document's unstructured content. The record can be inputted to the trained classifier at process block 140, to determine a structure graph of the input document. Given N as a number of tokens inputted to a given level of the trained classifier, the outputs of the given level can represent $N \cdot (N-1)/2$ pairwise combinations of the N tokens. The outputs can define one or more edges of the structure graph. Blocks 130, 140 can be performed during a runtime phase 104, e.g. upon receipt of the input document.

Inset 101 of FIG. 1 illustrates an example of inputs and outputs to the given level. An ML classifier 160 is shown with one or more levels, including the given level 160C. Other optional levels of classifier 160 are shown in dashed outline. That is, in varying examples, level 160C can be a sole level of classifier 160, or can be preceded by one or more levels, or can be followed by one or more levels. Input 161 to classifier level 160C can be a record of length N, representing N input tokens of an input document. In some examples, each of the N positions of record 161 can be a vector encoding a word embedding of the associated token, together with positional encoding or other token metadata. Output 169 from classifier level 160C can be a record comprising N−1 or N vectors, with the $i^{th}$ position of the $j^{th}$ vector indicating a relationship status between the $i^{th}$ and $j^{th}$ tokens. As illustrated, the output vectors can have $(N-1)+(N-2)+(N-3)+ \ldots 2+1+0=N \cdot (N-1)/2$ positions, representing all pairwise combinations of the N input tokens. In other examples with directed relationships between tokens, the $i^{th}$ position of the $j^{th}$ vector can represent a relationship from token i to token j (denoted i→j), while the $j^{th}$ position of the $i^{th}$ vector can represent a relationship j→i, and both upper and lower triangles of output array 169 can be retained, for $N \cdot (N-1)$ directional combinations of the N tokens.

Numerous variations or extensions can be implemented. Graphs of documents in the training corpus (dubbed "training graphs") can be organized into a hierarchy of levels to facilitate hierarchical detection of structure in documents evaluated at runtime. The ML classifier can be trained separately for each level. For example, a first loss function can be used to train the classifier to identity level one structure or relationships in the training graphs. After successful level one training, a second loss function can be used to train the classifier to further identify level two structure or relationships in the training graphs, and so forth for additional layers. One or more classifiers levels such as 160C can be implemented as a transformer neural network.

In some deployments, a plurality of ML classifiers can be trained for respective classes of documents (e g manufacturing tracking sheets, inventory reports, orders, shipping logs, quality inspection reports, and so forth), and a received document can be determined to belong to a particular class, and the appropriate ML classifier can be invoked. In further examples, a schema of fields for a given class can be defined at or prior to phase 102 and used at phase 104 to recognize tokens of the input document as instances of respective predefined fields. The recognized fields can be used to populate one or database records with content from the input document. Alternatively or additionally, the structure graph can be stored, or returned to a requesting client.

Example Dataflow Diagram

Figure 2:
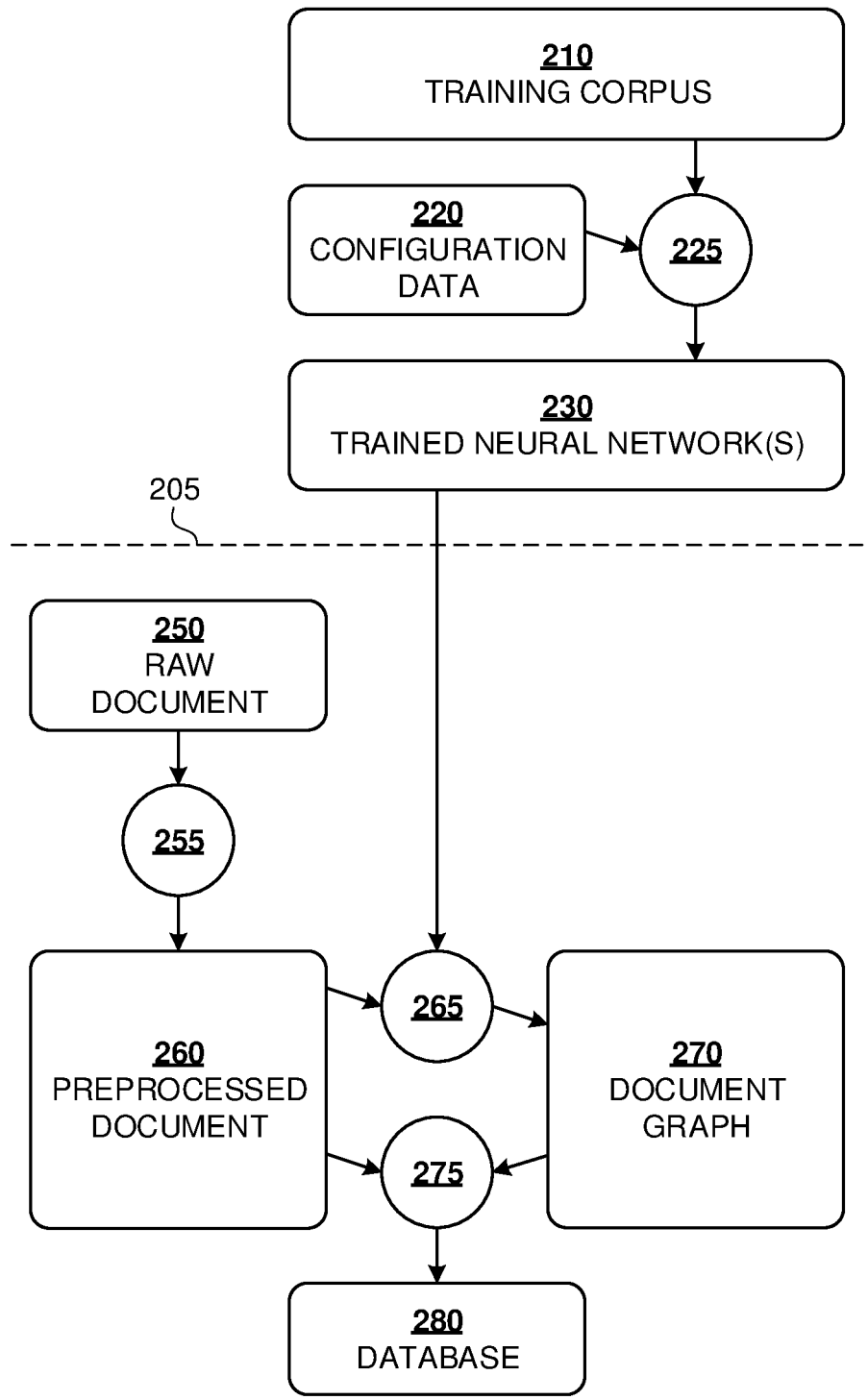
FIG. 2 is a dataflow diagram according to an example of the disclosed technologies.

FIG. 2 is a dataflow diagram 200 according to an example of the disclosed technologies. The diagram proceeds from inputs 210, 220 to outputs 270, 280. Data item 210 can be a training corpus, while data item 220 can be configuration data for a particular application. The training corpus 210 can include input features corresponding to text tokens and output labels defining a structure graph, for each of a set of training documents. Configuration data 220 can specify fields or relationships sought to be identified within documents, or parameters of an ML classifier. The parameters can include parameters defining the structure of a neural network, formatting of inputs or outputs, or loss functions used for training. Output 270 can be a representation of a graph indicating relationships between tokens of an input document 250. Output 280 can be one or more records of a database, populated with values defined by the tokens of input document 250. In FIG. 2, dashed line 205 separates training (above line 205) from runtime (below line 205) phases of activity.

The configuration data 220 and training corpus 210 can be provided as inputs to process block 225, to obtain a trained neural network 230. Process block 225 can be similar to block 120 described herein. Process block 225 can include using one or more loss functions to train a neural network by back-propagation to minimize errors in predicting output labels (e.g. structure graphs) of training corpus 210 when respective input features (e.g. tokens of training documents) are provided as inputs to the neural network. The trained neural network 230 can be stored and made available for subsequent analysis of text documents 250.

At runtime, a raw document 250 can be input to process block 255 to obtain a preprocessed document 260. The raw document 250 can be a physical piece of paper or an electronic document, in a format such as portable document format (PDF), a FAX or scanned copy of a document, a word processor file, a database entry, or a plain text file. In varying examples, the preprocessing can include optical character recognition (OCR), token extraction, word embedding, named entity recognition (NER), positional encoding, or other metadata encoding. Some of these functions can be omitted from block 255, or can be incorporated within the trained neural network 230. The preprocessed document 260 can include an input record in the form of a sequence of vectors for respective tokens of the raw document 250. In some examples, process block 255 can be similar to operations of block 130 described herein.

The preprocessed document 250 and the trained neural network 230 can be input to block 265, where the neural network 230 can evaluate the document 250 to generate a document graph 270. Block 265 can be similar to block 140 described herein. The document 260 and the graph 270 can further be input to block 275 to update the database 280. At block 275, the graph 270 can be used to bridge content of document 260 or 250 with columns of database 280, so that a record for input document 250 can be added to the database and appropriately populated with content of the input document 250 according to the structure graph 270.

Numerous variations or extensions can be implemented. In some examples, word embedding can be included in a layer of a classifier neural network. In further examples, document graph 270 can be stored in a repository, or returned to a client from which the raw document 250 was received. In additional examples, results of document evaluation at block 265 can be used to dynamically update the trained neural network 230 for continual learning.

First Document Example

FIGS. 3A-3D are diagrams 301-304 illustrating processing of a document 310 according to an example of the disclosed technologies. To avoid clutter, reference designators for common items are not duplicated in diagrams 301-304. Diagram 301 of FIG. 3A illustrates the raw document 310, which can be an invoice for purchase of scientific equipment, in this case two glass slides and one microscope, from a provider "ABC Supplies." Individual tokens can be extracted for text such as "ABC," "Supplies," "Description," "Glass," "Slides," and so forth. Furthermore, certain text tokens (e.g. "Date," "Price") can be recognized as named entities using a named entity recognition tool. An auxiliary table can be used to store pairs of (named entity, original document text) to allow retrieval of the original document text at a later stage of document processing.

Diagram 302 of FIG. 3B shows the document 310 after preprocessing and one level of graph extraction. For purpose of illustration, named entities are prefixed with "F:" (e.g. "F:Date:") for text fields, or with "N:" (e.g. "N:01/01/2020") for numeric fields. Various arrows in FIG. 3B illustrate some relationships that can be determined at this stage. Numerous unidirectional arrows identify key-value relationships. These include date token "N:01/01/2020" as a value of key "F:Date,", "12345" as a value of key "F:Invoice No.:", "1" and "2" as distinct values for a same key "F:Qty," "$22" and "$100" as distinct values of key "F:Price," "Microscope" as a value of key "F:Description," and "$122" as a value of key "F:Total." Additionally, several bidirectional arrows identify peer relationships between respective pairs fields. These include identification of simple tokens "ABC" and "Supplies" as constituents of a larger composite token, and similarly "Glass" and "Slides." A few peer relationships extend to cyclic or fully connected groups, such as "F:Qty," "F:Description," and "F:Price." Another cycle is formed by "1," "Microscope," and "$100," which are constituents of a single line item record. Finally, the provider address tokens "101," "Heisenberg," "Rd," "Home," and "Town" can be determined as fully connected, which is indicated by the dash-dot line in diagram 302 for simplicity of illustration.

Unidirectional and bidirectional arrows or relationships can correspond to directed and undirected edges of a structure graph.

Based on these relationships, diagram 303 of FIG. 3C shows several composite tokens that can be identified in document 310. These include Provider Name 331, Provider Address 332, Document Date 333, Document Identifier 334, Table Header 335, description token 336, Table Line Item 337, and Table Total 338. Using the composite tokens 331-338 as additional tokens of input document 310, the processes of identifying relationships and identifying new composite tokens can be repeated at successive levels to build up the structure graph of document 310.

Turning to diagram 304 of FIG. 3D, the following relationships can be identified at a second level of graph extraction. Provider address 332 can be identified as a property of Provider Name 331, as illustrated with a unidirectional arrow, and Line Item 336 can be identified as a value of key table header 335. Concurrently, original token "2," composite token "Glass slides," and original token "$22" can be identified as another line item 341. At a third level of graph extraction, Line Item 341 can also be identified as another value of the key table header 335. Then, Table Header 335 can be grouped with its two line items 341, 336 to form a third level composite token, Table 342. Finally, at a fourth level of graph extraction, the Table Total 338 can be linked as a property of Table 342.

Example Mapping

Figure 4:
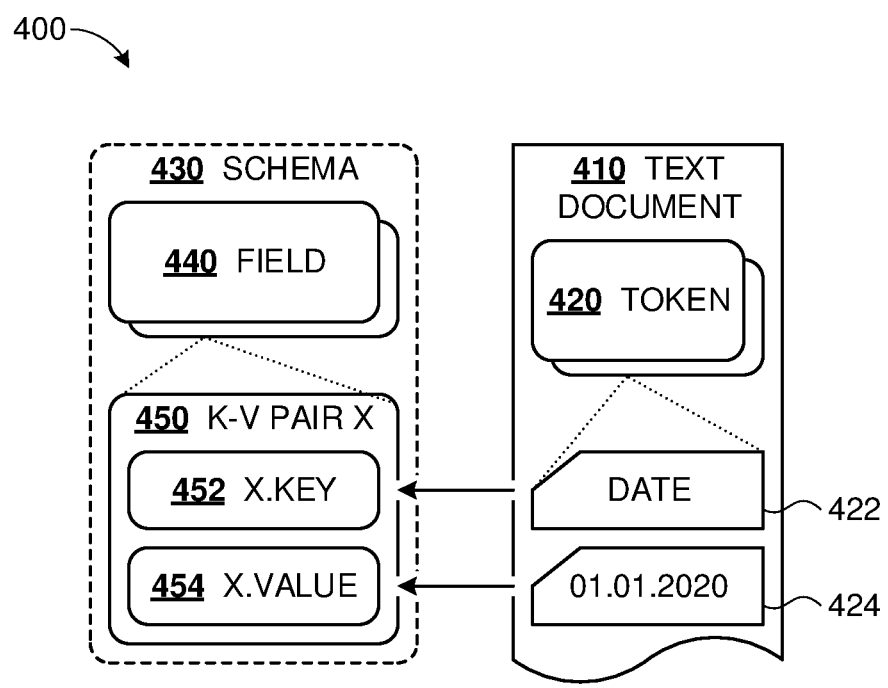
FIG. 4 is a diagram illustrating mapping of tokens according to an example of the disclosed technologies.

FIG. 4 is a diagram 400 illustrating mapping of tokens. In this diagram, tokens of a text document are mapped to previously defined fields.

Text document 410 comprises a sequence of tokens 420, including tokens "Date" 422 and "01.01.2020" 424. These tokens can be determined through preprocessing of an input document, at a process block similar to block 255 described herein.

Additionally, a number of document fields 440 can be predefined in a given application. A group of such fields is shown as a key-value pair 450 ("K-V Pair") named X. This pair includes fields for the key X.Key 452 and the value X.Value 454. The document fields can be predefined as part of configuration data similar to 220 described herein. In some examples, the fields 440 can be an unstructured collection of document fields, while in other examples the fields 440 can optionally be organized as part of a schema 430 as illustrated.

Numerous variations or extensions can be implemented. In some examples, the schema 430 can be organized hierarchically in a manner similar to the relationships between document fields discussed in context of FIG. 3. To illustrate, schema 430 can include a hierarchy with a table (corresponding to Table 342) having properties of "Table Total" 338 and "Table Header" 335, and constituent tokens of the table being Line Items 337, 341. The Line Items can have further constituents of Qty (corresponding to "2"), Description (e.g. 336), and Price (corresponding to "$22").

Second Example Method

Figure 5:
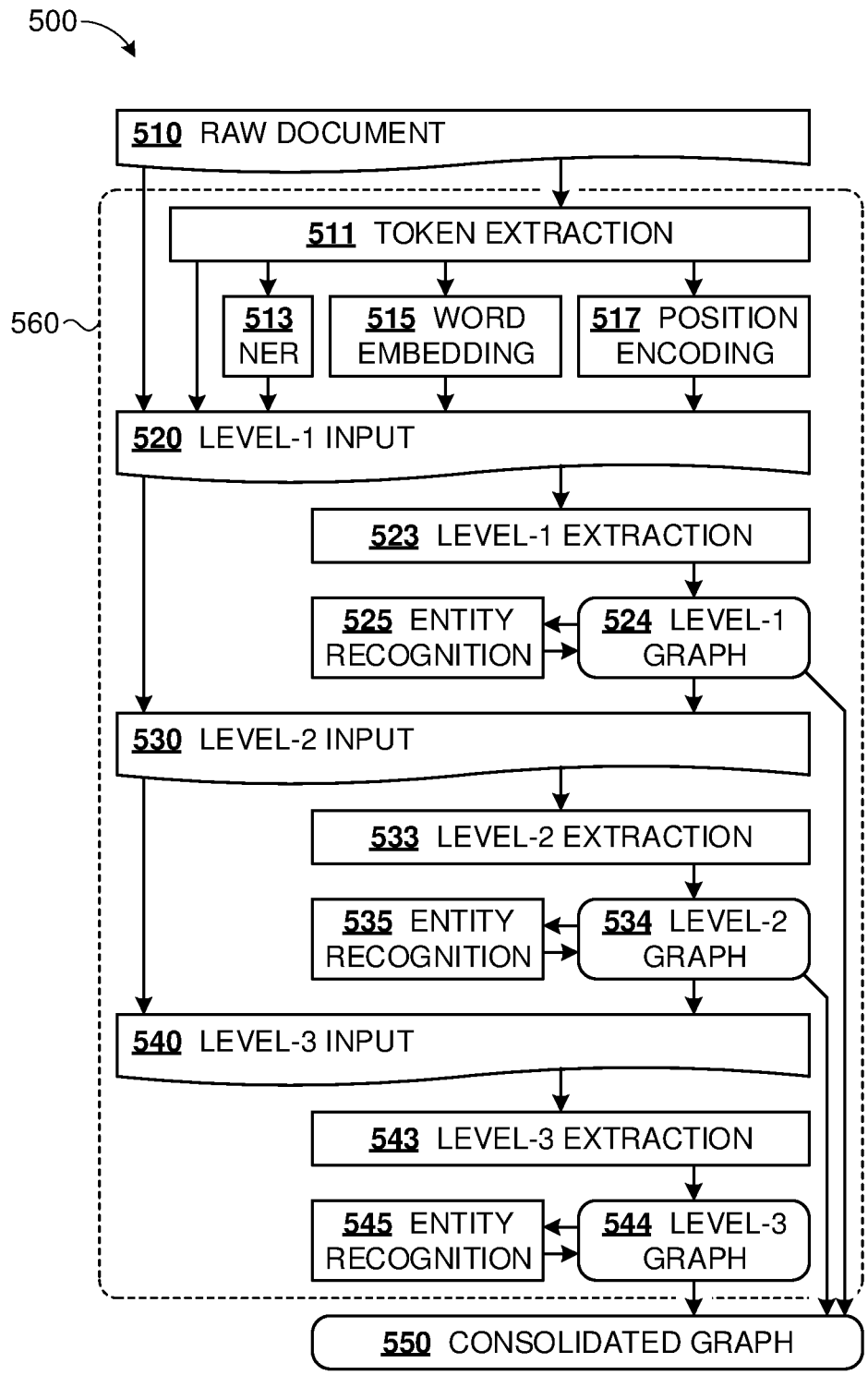
FIG. 5 is a hybrid diagram illustrating a second example method for extracting a graph structure of a document according to the disclosed technologies.

FIG. 5 is a hybrid diagram 500 illustrating a second example method for extracting a graph structure of a document. The graph extraction proceeds in multiple levels after the document is preprocessed, leading finally to a consolidated graph of the document.

Raw document 510 is provided as input to process block 511 for token extraction. With reference to FIG. 3A, words such as "ABC" or "Glass," or numbers such as "12345" can be identified as tokens. Following token extraction, additional preprocessing operations can be performed at process blocks 513, 515, 517. Block 513 can perform named entity recognition on tokens of document 510. For example, text fields such as "Invoice No." or a date field such as "01.01.2020" can be identified as named entities. Accordingly, the string token "01.01.2020" can be replaced by an identifier of the corresponding named entity, denoted herein as "N:01.01.2020" for the sake of legibility. At process block 515, tokens can be encoded using word embedding, to obtain respective vectors for each word token, using a tool such as Word2Vec or an equivalent tool. At block 517, positional encoding can be derived for each token, indicating a spatial position of that token in the raw document 510. To illustrate, the positional encoding for token "ABC" in FIG. 3A can indicate its centroid position having horizontal coordinate 0.7" from the left edge of the page and a vertical coordinate 0.5" from the top of the page.

Then, the outputs of one or more of the preprocessors 511, 513, 515, 517 can be combined to obtain an input record 520 for level one of the classifier 523. Optionally, some data from the raw document can also be used to build the input record 520. To illustrate, the record 520 can be a sequence of vectors, each vector representing a corresponding token of the document 510. Each of the input vectors of record 520 can include a word embedding representation of the corresponding token, as well as positional encoding information, and optionally additional metadata, such as font size, style, or color. For one-dimensional position encoding (i.e. a representation of document 510 as a linear sequence of tokens), the positional encoding information can be added (superposed) on the word embedding vector, or can be concatenated with the word embedding vector. However, for two-dimensional or three-dimensional position encoding, concatenation can be preferred, so as to avoid discontinuities or other issues with mapping multi-dimensional position information within a word embedding vector.

Input record 520 can be processed by level one graph extraction block 523 to extract a level one graph 524. Graph extraction block 523 can be a neural network, such as a transformer neural network. As an illustration, the output level one graph 524 can include edges for those relationships identified in FIG. 3B. In some examples, the level one graph 524 can be evaluated by entity recognition module 525 to identify predefined document fields in the graph 524, and these recognized fields can be used to tag or label corresponding vertices of graph 524.

Then, a level two input record 530 can be constructed using the input record 520 for level one and the level one graph structure 524. In some examples, composite tokens identified in graph 524 can be appended to the input record 520 as new tokens. In other examples, the composite tokens can replace their constituent simple tokens. To illustrate, a Provider Name token, with value "ABC Supplies" can replace the two separate tokens "ABC" and "Supplies."

Processing of the level two input record 530 can proceed similarly to the previous level. A level two graph extraction module 533, which can also be a neural network, can extract a level two graph 534, and further entities can be recognized by module 535, and vertices of graph 534 can be labeled accordingly.

A level three input record 540 can be constructed similarly, with new tokens from grouped tokens in graph 534 used to extend the level two input record 530, or used to replace the constituent tokens of each group, in any combination.

Processing of the level three input record 540 can proceed similarly to the previous level. A level three graph extraction module 543, which can also be a neural network, can extract a level three graph 544. Further entities can be recognized by module 545, and vertices of graph 544 can be labeled accordingly.

Finally, graphs 524, 534, 544 can be merged to form a consolidated graph 550, which can incorporate structure on multiple levels.

To summarize, the level one input can be obtained by preprocessing input text document 510 to generate the level one input record 520, which can include a sequence of input vectors representing respective tokens of the document 510. At each level 523, 533, 543, a respective input record 520, 530, 540 can be processed with a respective neural network to generate a portion 524, 534, 544 of the document's graph structure. For levels after the first level 523, that is, at subsequent levels 533, 543, the corresponding input record 530, 540 can be derived from the previous level's input record 520, 530 and the previous level's output graph portion 524, 534. Finally, a consolidated graph structure 550 which can include the graph portions 524, 534, 544, can be formed and outputted.

Numerous variations or extensions can be implemented. For example, while FIG. 5 illustrates three levels of graph extraction, this is not a requirement, and other counts can be used, ranging from two to ten levels, or sometimes three to five levels. In varying examples, graph 550 can be stored in memory or in persistent storage, transmitted over a network to a client from whom document 510 was received, or used to store content of document 510 in a database as described further herein. While FIG. 5 illustrates separate stages of graph extraction, in which each extraction block 523, 533, 543 can be implemented by a distinct neural network, this is not a requirement. In some examples, two or more extraction blocks can be combined within a single (larger) neural network. Optionally, one or more of preprocessing blocks 511, 513, 515, 517 or entity recognition blocks 525, 535, 545 can also be embedded within a neural network, hybrid, or other classifier 560 shown as dashed outline. In some examples, a complete multi-level classifier 560 can be trained end-to-end with raw training documents provided as input document 510 and training graphs 550 as output training labels.

Example Transformer Neural Network

Figure 6:
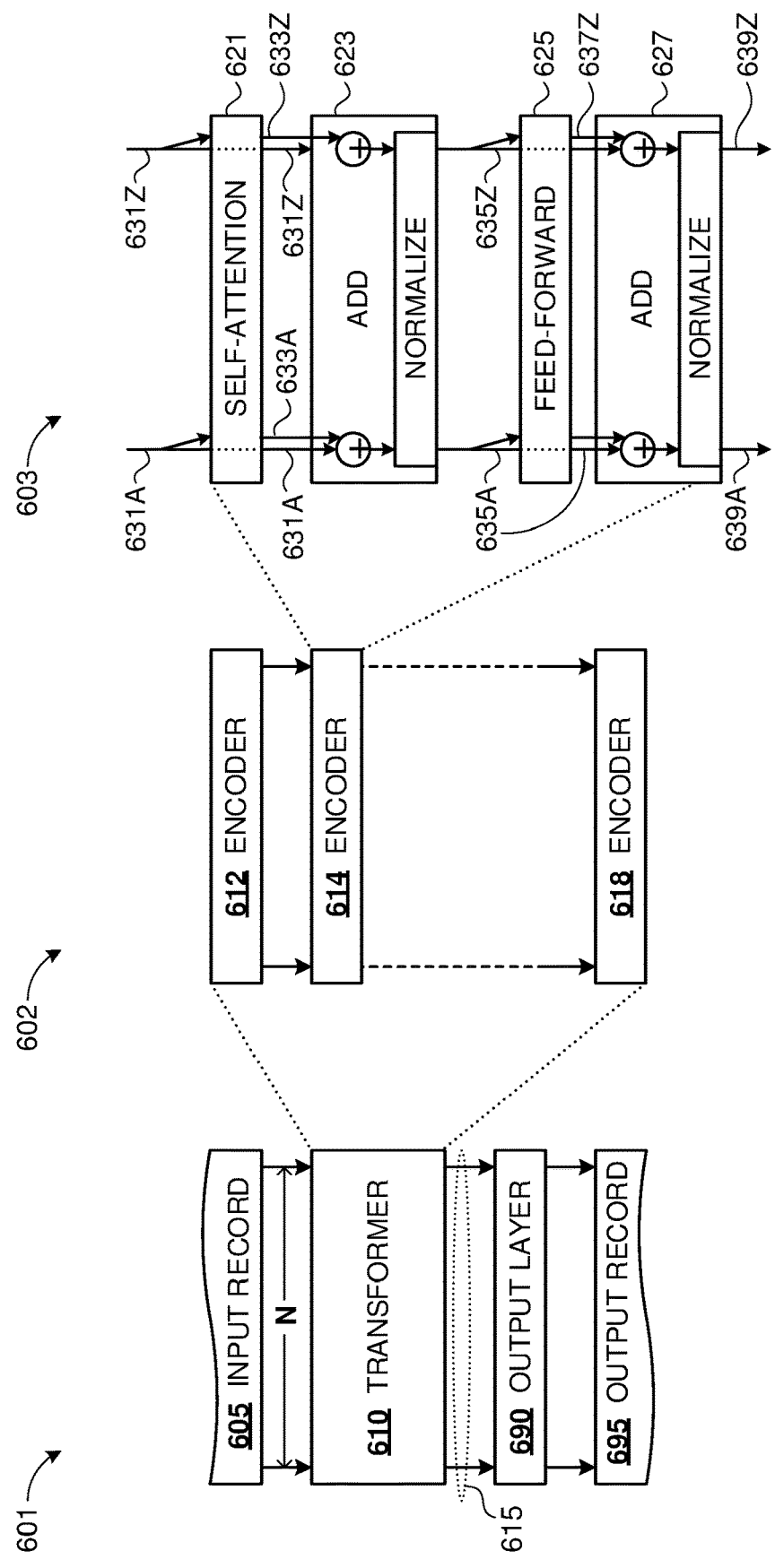
FIG. 6 is a diagram illustrating a transformer neural network suitable for implementing an example of the disclosed technologies.

FIG. 6 is a set of diagrams 601-603 illustrating a transformer neural network 610 ("transformer") suitable for use in disclosed embodiments. An illustrated neural network similar to 610 can be variously used to implement at least a portion of classifiers 160, 160C, 230, 510, 523, 533, 543, or other classifiers described herein.

Diagram 610 shows integration of transformer 610 in an application, coupled to receive an input record 605 and output an output record 695. The input record 605 can be similar to any of input records 161, 260, 510, 520, 530, or 540 described herein, while output record 695 can be similar to any of output records 169, 270, 510, 524, 534, or 544 described herein. In some examples, input record 610 can include respective features representing a number of tokens of a source text document, or a greater or smaller number of features, as composite tokens are added, or lower level tokens are removed from a previous level's input record. The number of tokens in the input record 605 is indicated as N in diagram 601. In some examples, a transformer can have a data path of uniform width, and outputs 615, 695 can also be organized as N vectors.

An additional output layer 690 can be coupled to the output 615 of transformer 610 to format the output 615 into the required classification labels. Output layer 690 can perform conversions between triangular and rectangular output arrays, or thresholding, so that a weighted output component in output 615 below a threshold, can be set to zero (no relationship) in the output record 695.

The description turns to diagram 602, which shows one possible structure of transformer 610, as a sequence of encoders 612, 614, . . . 618. In varying examples, the number of encoders can vary from 6 to 24, from 9 to 18, or about 12.

Diagram 603 in turn shows one possible structure of encoder 614. The other encoders of diagram 602 can have similar structure. Self-attention layer 621, described further below, receives inputs 631A-631Z, which can be N wide to match input record 605. Add-normalize layer 623 can add outputs of self-attention layer 621 to a bypass copy of inputs 631A-631Z, and can normalize the resulting record. Feedforward layer 625 can receives inputs 635A-635Z from layer 623. A second add-normalize layer 627 can add outputs of the feed-forward layer to a bypass copy of feed-forward inputs 635A-635Z as shown, and can normalize the result. The output of layer 627 is a record 639A-639Z, which forms the output of encoder 614. Self-attention layer 621 and feed-forward layer 625 contain matrices of weights coefficients which can be learned during a training phase such as 102 or a process block such as 225.

Self-Attention Matrix Operations

As a first illustration, a single-headed self-attention function is described. Input record 631A-631Z can be a sequence of N vectors. In varying applications, N can range from about $2^5$=32 to about $2^{19}$=524,288 according to a maximum expected size of a particular document class. N=512 is used in this illustration. Each vector can have E components, which can include a word embedding vector of length 20-1000 (often 50-500, or 100-200) and optional additional components for position encoding or metadata. The additional components can number from 0 to about 10, with commonly 2 positional encoding components and 0-1 metadata components. In this illustration, E can be 120, so that input record 605 is a sequence of 512 vectors, of length 120 components each. The other records transferred between layers, such as 631A-631Z, 635A-635Z, 639A-639Z, can be sized similarly.

Self-attention layer 621 can include Key and Value matrices K1, V1 to match the size 512×120 of input record 631A-631Z, dubbed matrix Q1. To reduce computations within the self-attention layer 621, weights matrices WQ, WK, WV can be used to reduce the dimensionality of the input from E=120 to, say, E'=60. Then, smaller matrices Q2, K2, V2 of size N×E' can be computed as Q2=Q1×WQ, K2=K1×WK, V2=V1×WV, where each of matrices WQ, WK, WV can have size E×E'. Then, an example self-attention function can be computed as Z3=softmax$\{c2 \cdot (Q2 \times K2^T)\} \times V2$, where c2 is a scaling constant, and the size of Z3 is N×E'. Finally, another weights matrix WZ of size E×E' can be used restore the size of output Z4 633A-633Z using Z4=Z3×$WZ^T$.

A second illustration is described with a multi-headed self-attention layer 621. Multiple attention heads can provide distinct recognition capabilities. As an example, one trained head can support detection of horizontally linked tokens, while another trained head can support detection of column fields, a third trained head can support identification of grammatically related text tokens, and a fourth trained head can support identification of key-value pairs in a document. Commonly, 4-20 attention heads can be used, often 6-12, or about 8-9. For each attention head, separate Q1, K1, V1 matrices can be defined for each head. A smaller value of E' can be used as compared to a single-headed attention function, which can be regarded as due to the smaller amount of knowledge required to be learned by each of the multiple heads. In turn, this can significantly reduce the computational burden. In the illustrated example, 8 heads and E'=30 can be used. Thus, for each of h=1:8, Z3 can be calculated as above, $Z3_h = \text{softmax}\{c2 \cdot (Q2_h \times K2_h^T)\} \times V2_h$. Finally, $Z4 = [Z3_1\ Z3_2 \ldots Z3_8] \times WZ^T$ can be used to consolidate the 8 heads into a single output record, wherein the square brackets denote horizontal concatenation of the $Z3_h$ matrices, and WZ denotes a weights matrix of size E×(8E'), and the desired size N×E of output Z4 633A-633Z is restored.

Numerous variations or extensions can be implemented, in addition to sizing variations of transformer 610 and its constituent parts. Discriminants other than softmax can be used for self-attention calculation. Other layers or functions can also be introduced, such as rectified linear units (RelU) or bypasses. Transformer 610 can support intermediate outputs for diagnostic purposes.

Second Document Example

FIGS. 7A-7D are diagrams 701-704 illustrating processing of an example document. In this example, the document can be a report of a procedure performed by a laboratory. Diagrams 701-704 illustrate classifier outputs encoding relationships (graph edges) between document tokens, and composition of token groups into composite tokens.

Figures 7A, 7B:
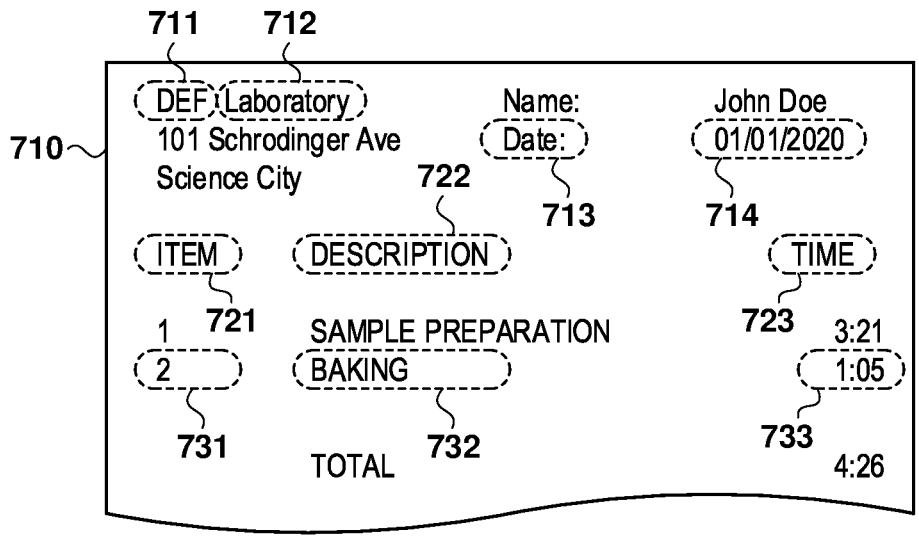
FIGS. 7A-7D are diagrams illustrating processing of a second document according to an example of the disclosed technologies.

FIG. 7A illustrates the original document 710, with tokens 711-714, 721-723, and 731-733 marked in dashed outline. Tokens 711-712 are pieces of a Provider Name, tokens 713-714 are constituents of a Document Date, tokens 721-723 are constituents of a Table Header, and tokens 731-733 are constituents of a Table Line Item. In this example, capitalization (e.g. Provider Name) is used to denote fields that have been predefined for the document, for example as part of configuration data such as 220. Such fields are consistently used in the description for clarity of illustration; however, some or all of these tokens will only be mapped to their respective fields during or after graph extraction.

FIG. 7B illustrates a portion 702 of a graph output from a level one classifier for document 710. The graph is presented as an array 720 of column vectors for each token 711-714, 721-723, 731-733. Each row of the array 720 also corresponds to a respective token 711-714, 721-723, 731-733 for which the column vectors can have a relationship. In the illustrated encoding, a zero indicates that the column token has no relationship to the row token. Non-zero values in array 720 can indicate relationships between tokens, and can define edges of the document's structure graph.

As one example of a relationship, the column for token 714 (or simply column 714 for short) has an entry "22" in the row for token 713 (row 713 for short), indicating that token 714 ("01/01/2020") has a relationship to token 713 ("Date:"). Inasmuch as column 713 has a "0" in the row 714, the relationship between these two tokens is directional, which can be denoted as 713←714. Code "22" can indicate a key-value relationship, i.e. "01/01/2020" is a value of the "Date:" key. A key-value relationship is an example of a directed relationship, and the code "22" for edge 713←714 can denote a directed edge of graph 720.

As another example of a relationship, columns 711, 712 have entries "11" in each other's rows, indicating a symmetric relationship which can be denoted as 711↔712. Code "11" can indicate a peer relationship, i.e. "DEF" and "Laboratory" are peers of each other. (These tokens can subsequently be identified as Provider Name.) A peer relationship is an example of an undirected relationship and the code "11" for edge 711↔712 can indicate an undirected edge of graph 720.

In the illustration of FIG. 7B, all column vectors are the same length, and mirrored positions above and below the diagonal support directional relationships. However, this is not a requirement, and in other examples, just the upper triangular matrix or just the lower triangular matrix within array 720 can be retained. In some examples, only undirected relationships may be supported, and just one of the triangular matrices can be used. In other examples, the coding can indicate the direction of a directional relationship, for example "22" at column 714 row 713 can indicate a relationship 713←714, while "−22" can be used to indicate the converse relationship 714←713. An advantage of using just a triangular matrix (see also outputs 169 of FIG. 1) is a reduction in the size of a neural network implementing a classifier layer, with attendant runtime benefits of less storage required and less computation required. In some examples, use of a triangular matrix can require about, or at most, half the computation as retaining the full matrix.

As further examples of relationships, tokens 731-733 have a cycle of peer relationships to each other, encoded as "11" both above and below the diagonal of array 720. These tokens are fields of what can subsequently be recognized as a Table Line Item. Similarly, tokens 721-723 have a cycle of peer relationships to each other, as they are tokens of what can subsequently be recognized as a Table Heading. (Peer relationships between three or more tokens can often form a cycle.) Additionally, the line item tokens 731-733 can have is-a-value-of relationships (code "22") to the table heading tokens 721-723, as indicated by the relationship codes "21" in the array positions 721←731, 722←732, 723←733.

The diagonal positions in array 720 (e.g. column 711, row 711; column 712, row 712; and so forth) are shown with hatched shading for clarity of illustration, however as a practical matter these positions can be coded "0" to indicate no relationship between a token and itself, or with another value.

Figures 7C, 7D:
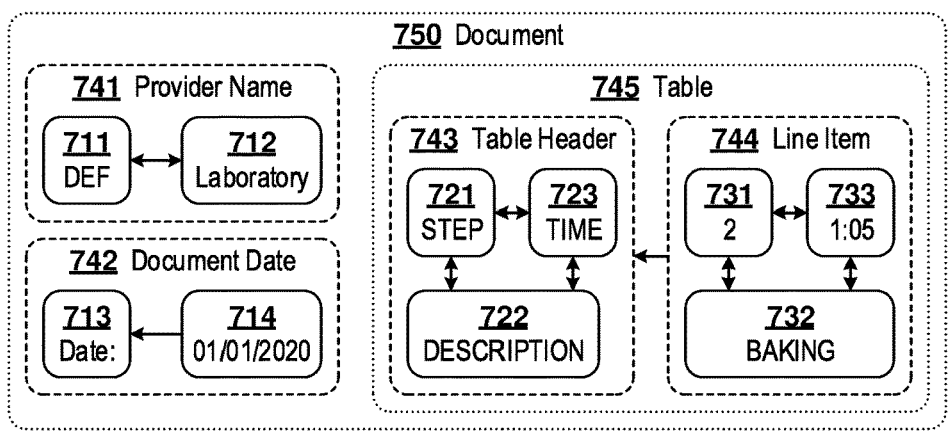

Turning to FIG. 7C, diagram 703 is a representation of document 701 showing identification of some fields in or from the graph representation (array 720) of FIG. 7B. Solid outlines (e.g. tokens 711, 712) indicate tokens input to level one of a classifier, and the arrows joining them represent relationships determined in graph 720, for example 711↔712. Dashed outlines indicate composite tokens that can be recognized as part of the first level graph extraction. These composite tokens (e.g. Provider Name 741 or Line Item 744) can be added as composite tokens in an input record (e.g. similar to record 530) for one or more further levels of graph extraction.

In some examples, the composite token can be determined within a neural network, e.g. at process block 523, while in other examples the composite token can be determined subsequent to graph extraction, e.g. at process block 525. In further examples, the entity recognition can be split between these or other process blocks. A few different cases can be described in context of FIGS. 7A-7C.

In a first example, a trained classifier can recognize that a date (token 714) near the top right corner of a document belongs to a Document Date 742. That is, the code 22 returned in array 720 can indicate not merely "is a value of [a key]" but can further indicate "is a document date value [of the key]". In a second example, the classifier can simply recognize that 713←714 is a key-value pair, and an entity recognition block similar to block 525 can evaluate the key-value pair against predefined fields to recognize that this particular key-value pair is the Document Date 742. In a third example, the entity recognition can be aided by a preprocessing block such as 513, where the token "Date:" can be recognized as a named entity as described in context of FIG. 3B.

In a fourth example, the combination of peer relationships between 731↔732↔733 together with the key-value relationships between 721←731, 722←732, 723←733 can be used together to infer that 731-733 are a Line Item 744. Recognition of other level one fields Provider Name 741 and Table Header 743 can be done similarly.

FIG. 7C also shows higher level relationships and fields, the higher level fields being indicated by dotted outline. At level two, Line Item 744 can be identified as a value of a key Table Header 743, as shown by arrow 743744. Together, the related composite tokens 743, 744 can be recognized as Table 745. In some examples, after all token relationships have been determined, disjoint portions of the graph can be joined together by linking each top-level token 741, 742, 745 to a root token 750, encompassing the entire document 710.

FIG. 7D illustrates an array 704 with parts 720, 728, 782, 788, in which the introduction of new composite tokens adds respective rows and columns to array 720 of FIG. 7B. Tokens 711, 712 are both coded as constituents of Provider Name 741 with relationship code "31". Similarly, tokens 731, 732, 733 are coded as constituents of Table Header 743 with relationship code "51". The relationship codes can also distinguish different constituents of a composite token. Tokens 713, 714 are respectively indicated to be the key and value of Document Date 742 by distinct relationship codes "41" (key) and "42" (value). Similarly, tokens 731-733 can be coded with relationship codes 61-63 to indicate respectively Step, Description, and Time values of Line Item 744. Eventually, relationships between composite tokens can also be populated into array 740. As Line Item 744 is determined to be a value of Table Header 743, the relationship 743←744 can be coded as "21" as shown. Similarly, Table Header 743 and Line Item 744 can respectively be denoted as header and member of Table 745, with the respective codes 71, 72 as shown.

Parts 720, 728, 782, 788 of array 704 are shown exploded for clarity of illustration, however they can be collected or merged as a single array 704. The various parts 720, 728, 782, 788 can be determined at different levels or process blocks of a graph extraction procedure. For example, array 720 can be output by a level one classifier at process block 523, array part 782 can be determined by entity recognition at process block 525, while array part 788 can be determined at higher levels of the graph extraction. A single part of the array can be partially determined in each of two or more levels of the graph extraction.

Numerous variations can be implemented. Although array part 728 is shown devoid of relationships (all zeros), this is not a requirement. In other examples, a later determined field (e.g. a Line Item) can have a directed relationship to a previously determined field (e.g. a Table Header). Such a situation can arise if the Line Item has more complex structure than an earlier recognized Table Header. In further examples, each component of the column vector can be a data structure with multiple constituents, rather than a single number. For example, a tuple can be used to convey a relationship type (e.g. key-value), a tentative matched field (e.g. Document Date), a confidence level in the determination, or other metadata.

Third Document Example

FIGS. 8A-8B are diagrams illustrating structure extraction of a third document 810, which is a lab record. FIG. 8A illustrates a relevant portion of the document 810, showing a series of operations performed on a sample. Two cycles of operations are performed, each comprising a soaking operation 821, 822, a drying operation 831, 832, and a baking operation 841, 842, with times listed in hours:minutes for each operation (20 minutes, 40 minutes, and so forth). At the bottom of the document, summary records 823, 833, 843 tally the total time spent soaking (0:20+0:40=1:00), the total time spent drying (0:45+0:53=1:38), and the total time spent baking (1:15+2:25=3:40), respectively. A final record 853 tallies the total process time (1:00+1:38+3:40=6:18).

Boundary 824 is drawn around the soaking records 821-823. Necessarily, this boundary encompasses drying time records 831-832, baking time records 841-842, and even a portion of the total drying record 833. There is no clean separation between bounding rectangles for soaking records 821-823, drying records 831-833, and baking records 841-843. Such document organization, which is quite common, can present a challenge for methods using geometric differentiation of document regions to extract structure.

FIG. 8B shows the same document 810 with the soaking time fields processed by the disclosed technologies. For clarity of illustration, the text of drying time records 831-833 and baking time records 841-843 is omitted from FIG. 8B although still present in the document 810. As indicated by dotted outlines, at level one of graph extraction, pairs of adjacent tokens (e.g. "Soaking" and "Time") can be identified as having peer relationships, and can be replaced with composite tokens 825, 826, 827, and 855, similarly to the processing of documents 310, 710 and other examples described herein. At level two of graph extraction, compound token 825 can be identified as a key for the time value "0:20," leading in turn to formation of a composite token for the entire record 821, and similarly for records 822, 823, 853. At level three of graph extraction, peer relationship 861 can be determined between the tokens of records 812, 822, and directional is-a-part-of relationships can be determined from each of tokens 812, 822 to token 823. Thus, the entire soaking time table 824 can be identified based on the relationships identified at level three. Additionally, another is-a-part of relationship from token 823 to 853 can be identified (arrow 865).

The drying time and baking time records 831-833, 841-843 can be processed in parallel with the soaking time records 821-823, leading to respective tables (not shown) similar to soaking time table 824, and additional is-a-part-of directional relationships from records 833, 843 to grand total record 853. Thus, following level three, another structure can be identified containing records 823, 833, 843, 853. In this illustration, a single token (composite token 823) can be directly part of two distinct document fields 824, 854 representing Soaking Table 824 and a Summary Table 854 respectively. That is, documents fields 824, 854, which are not part of one another, can share a common constituent token 823. This capability of recognizing multiple interlocking structures with common tokens is beyond the capabilities of conventional technologies that are limited to determining tree graphs.

Example Database

Figure 9:
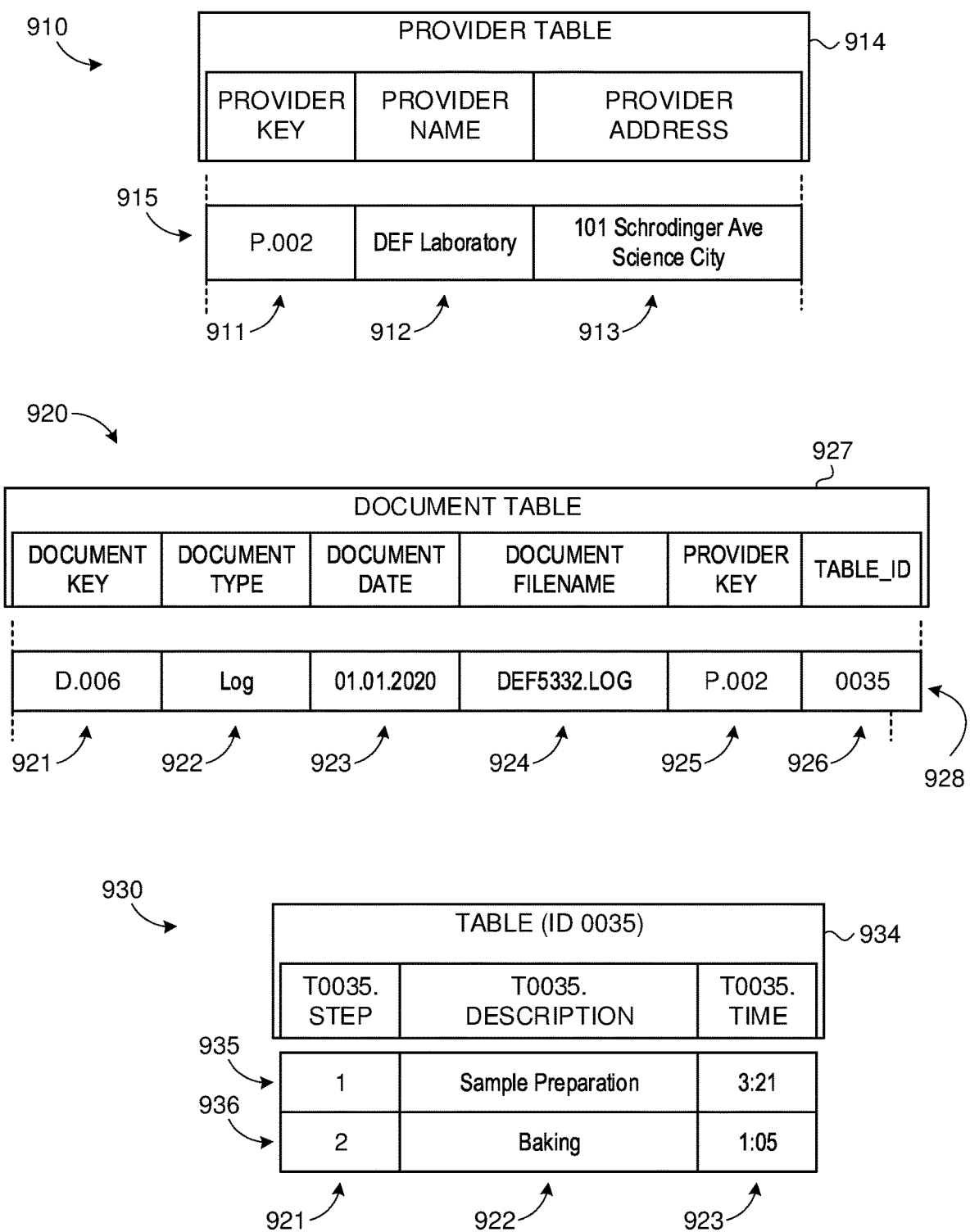
FIG. 9 is a diagram illustrating three tables of a database according to an example of the disclosed technologies.

FIG. 9 is a diagram illustrating three tables 910, 920, 930 of a relational database, according to an example of the disclosed technologies, and is described in context of document 710 of FIG. 7. Tables 910, 920, 930 can be stored in memory or on a storage device. Respective headers 914, 927, 934 shown for clarity of illustration, but need not be included with respective tables 910, 920, 930 as stored in memory or on a storage device. As each document 710 is processed, extracted structured content can be added as records to one or more of these tables 910, 920, 930. Database tables 910, 920, 930 can be stored in a database management system.

Table 910 can be a table of providers associated with documents in the database, and can have one record (row) 915 for each of multiple document providers. Table 910 is illustrated with three exemplary columns, a provider key 911 ("P.002") which can be used to link the provider record in other tables, a provider name 912 ("DEF Laboratory") matching the Provider Name composite token 741 extracted from document 710, and a Provider Address 913 also matching content of document 710.

Table 920 can be a table listing the various documents organized within the database, and can have one record (row) 928 for each document in the database. The exemplary columns illustrated include a document key 921 ("D.006") which can be used to link the document to other relational tables and a provider key 925 ("P.002") which can link back to the corresponding record 915 in provider table 910. Other columns of table 920 can include a Document Date 923 ("01.01.2020") obtained from document 710, a Document Filename 924 ("DEF53322.LOG") in which the document is stored, and a Table_ID 926 ("0035") assigned to the particular Table Header 743 detected in document 710. Another column Document Type 922 ("Log") can classify the table as a log (e.g. a log of a process performed on a sample). In varying examples, the Document Type can be determined from structure extraction, e.g. based on the recognized Table Header 743; can be determined based on a file extension (".log") or other metadata not included within the document content; or can be associated with a particular trained classifier such as 560. That is, in a given computing environment, a single database can store data of varying classes of document (such as logs, invoices, manufacturing route sheets, quality assurance certificates), and each document class can have a respective classifier to extract structured content of that document class.

Table 930 can be a database table storing structured content of a table 745 extracted from document 710. The exemplary columns illustrated, 931-933, can correspond to the fields of Table Header 743, and the rows 914-915 can store content extracted from Line Items of document 710.

Third Example Method

Figure 10:
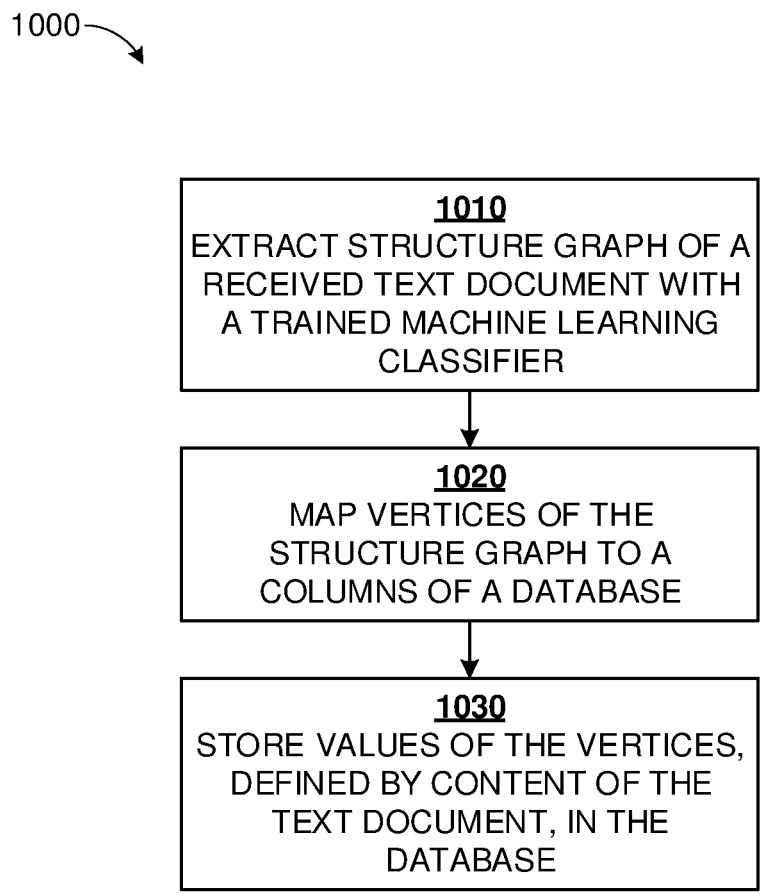
FIG. 10 is a flowchart of a third example method for transforming unstructured document content into structured database content according to the disclosed technologies.

FIG. 10 is a flowchart 1000 of a third example method for transforming unstructured document content into structured database content. In this method, a graph is extracted from the document and mapped to database columns, and structured content is stored in a database.

At process block 1010, a trained ML classifier can be used to extract a structure graph from a document. The graph can include multiple vertices having respective values defined by content of the text document. In varying examples, process block 1010 can be performed by one or more techniques described in context of FIG. 1-3 or 7, or variations thereof.

At process block 1020, one or more vertices of the structure graph can be mapped to columns of a database. In context of FIGS. 7 and 9, a Provider Name composite token 741 extracted from document 710 can be mapped to the Provider Name column 912 of database table 910. In some instances, two or more graph vertices (e.g. Provider Name and Provider Address) can be mapped to columns of a single database table 910, while in other instances two or more graph vertices (e.g. Provider Name, Document Date, or the Step value "2" of Line Item 744) can be mapped to different tables 910, 920, 930. Two vertices mapped to different tables (e.g. the value 714 of Document Date 742, and the Step value 731 of Line Item 744) can sometimes be constituents of distinct higher-level fields (vertices) in a structure graph 704 of a document 710.

At process block 1030, respective values of the mapped vertices can be stored in the database. For example, the value of Provider Name 741 can be "DEF Laboratory" as extracted from document 710, and this same value can be stored at the corresponding column 912 of record 915 in table 910. For a key-value pair such as Document Date 741, the Value 714 can be stored in table 920, while the Key 715 "Date:" can be omitted, as being implicit in the column "Document Date." In other examples, the Key of a Key-Value pair can match the column label of a database table.

Numerous variations or extensions can be implemented. For example, a vertex mapped to a database column can have a value which is a named entity. In some instances, the named entity (e.g. date "N:01/01/2020" in FIG. 3B can be retained within the database, while in other instances the named entity can be decoded to the original document content ("01/01/2020") or equivalent (e.g. "01.01.2020" or an integer representation of the date). In some examples, an auxiliary data structure can be maintained to allow tracing back from a compound token to its constituent simple tokens, or from a named entity to the original document text.

A record (such as 915) can be added to a database table (such as 910) for a text document 710. For multiple vertices (such as Provider Name 741 or Provider Address) of a structure graph (such as 704), respective columns (such as 912, 913) of table 910 can be identified. The values (e.g. "DEF Laboratory," "101 Schrodinger Ave, Science City") defined by the tokens represented by vertices (e.g. Provider Name 741 or Provider Address) can be stored at the identified columns of record 915, as illustrated in FIG. 9.

In further examples, another record (such as 927) can be added to a second database table (such as 920) of a relational database environment (such as illustrated in FIG. 9). A value (e.g. "01.01.2020") of a token (such as 714) represented by the vertex Document Date 742 can be stored at a corresponding column (such as 923) of the second table (920), as illustrated in FIG. 9.

Additional Example Features

1. Character Level Input

Some examples described herein provide input to a graph extraction classifier in the form of features representing words or named entities; however, this is not a requirement and inputs at other scales can also be used. For example, input can be provided at the character level, in a form such as a spatially tagged array of characters (e.g. a two-dimensional array of characters, dubbed a "char-grid"), and level one relationships between adjacent characters can be used to identify words. This can be advantageous in documents where letters and numbers are mixed without whitespace delimiters (e.g. a token "v2" as short form for "version 2"), for handling spelling mistakes, for handling punctuation irregularities (e.g. missing space between a quantity and its units, such as "70F" or "10s" for temperature and time quantities), for recognizing infrequently used compound words (e.g. "cabdriver"), for mixed language documents, for documents having meaningful text in addition to words (e.g. codes on airline tickets). In other examples, input can be provided in larger units such as sentences, paragraphs, or rows of a table, and an initial task of a graph extraction tool can be to parse the sentence or table row into simple tokens. The initial parsing can also resolve some relationships between these tokens.

2. Distribution of Computation

Some examples described herein utilize hierarchical structure extraction to progressively identify or build larger structures from the document content. Once all relationships have been determined for a given lower level token, such a token can be omitted from higher levels of graph extraction. For example, once vendor address 332 has been identified, subsequent levels can omit the individual simple tokens "100," "Heisenberg," and so forth. In this way, the length of an input record at a higher level of graph extraction can be significantly shorter than the number of simple tokens in the original document.

At lower levels of graph extraction, it can be desirable to retain all simple tokens. Nevertheless, other techniques can be employed to reduce the amount of computation at lower levels, such as by reducing the number of non-zero weight coefficients in weight matrices in neural networks at the lower levels. In some examples, each simple token can have a restricted scope for identifying first level or even second level relationships. The restricted scope can be based on positional encoding. To illustrate, with reference to FIG. 3B, the number "2" can be associated with table column heading "F:Qty" at level one, and with "Glass Slides" at level two, however the likelihood of a direct relationship between "2" and e.g. "F:Price" or "N:01/01/2020" is small, and the relationship evaluation for "2" can be restricted to vertical and horizontal bands around the location of the token "2." In other examples, the restricted scope can be based on font, other metadata, or section or page boundaries.

Because evaluation of relationships among N tokens in general requires $O(N^2)$ computations, adjusting the space (e.g. distance scale) over which relationships can be identified can be effective in reducing the graph extraction computation at lower levels of structure extraction. Computation can be more evenly distributed between several levels of graph extraction, for an overall enhancement in computing efficiency.

3. Usage of the Disclosed Embodiments

In some examples, the disclosed technologies can be deployed in a client-server architecture, where a client issues a request for structure extraction for a given text document. The request can be accompanied by the text document or by a link to the text document. The server can receive and act on the request to extract a graph of structured content from the text document. In varying examples, the structured content can be returned to the requesting client in the form of a graph, can be stored as a graph in a repository, or can be stored distributed among columns of one or more database tables in a database environment, in any combination. The server can return a notification to the requesting client indicating successful completion of the request, or can return an exception indicating lack of support for the class of the text document. In other examples, the server can implement the disclosed technologies as a service in a SaaS (software as a service) model, which can be called from a remote or client-side application.

In additional examples, the disclosed technology can be operated from a console, and can be directed to process a group of files, such as all files (optionally matching a filter condition) in a file folder or other repository.

The training and runtime portions of the disclosed technology can be deployed separately. Thus, in further examples, the disclosed technologies can be deployed as a service to train an ML classifier on a training corpus for a given class of documents. The service can include determination of optimal hyperparameters and configuration parameters to provide efficient computation with as few as possible matrices, encoder layers, word embedding lengths, and so forth, to meet a desired performance target. The trained classifier can be transmitted over a network for subsequent implementation at one or more locations controlled by or accessible to a client.

A Generalized Computer Environment

Figure 11:
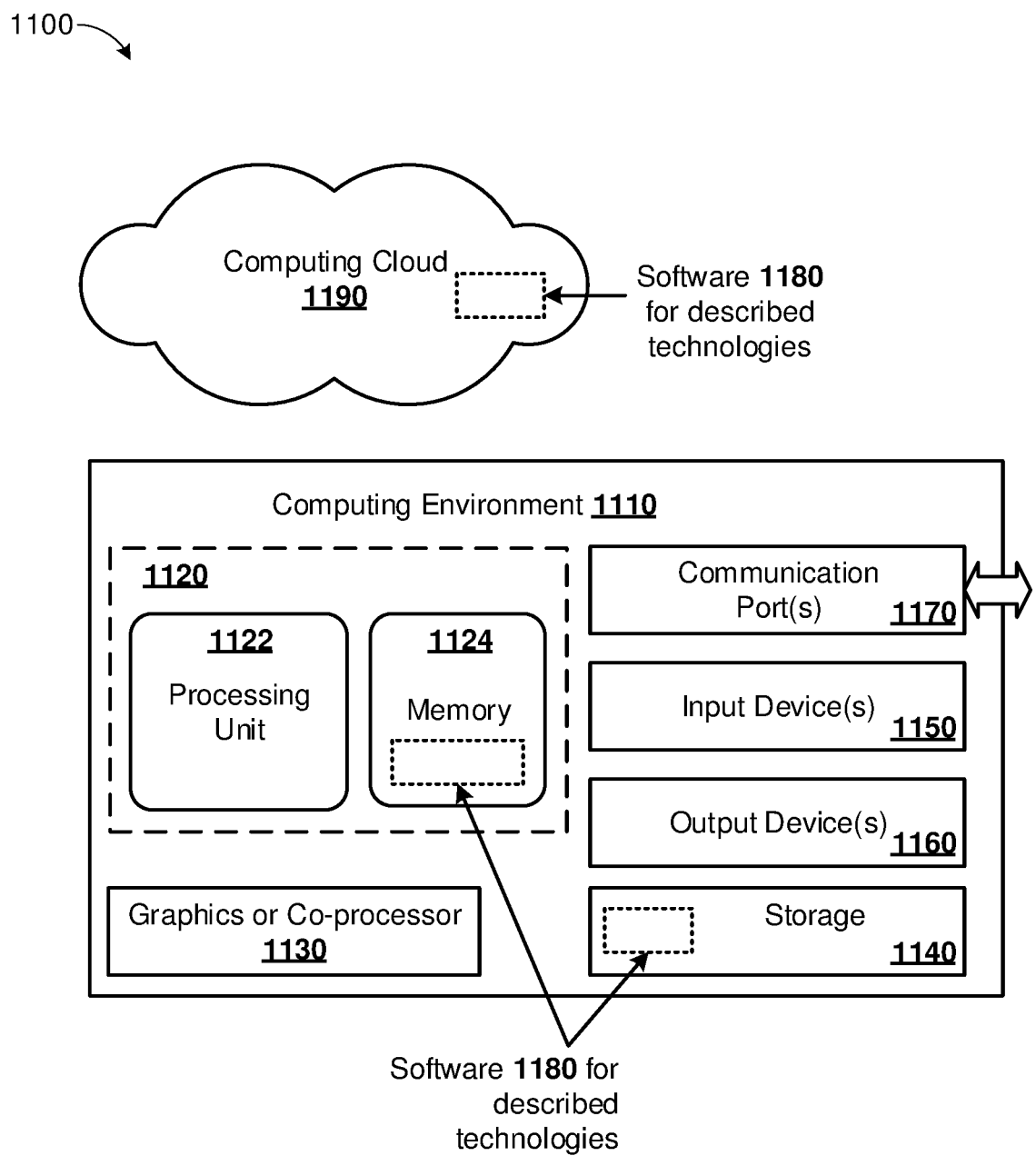
FIG. 11 is a diagram schematically depicting a computing environment suitable for implementation of disclosed technologies.

FIG. 11 illustrates a generalized example of a suitable computing system 1100 in which described examples, techniques, and technologies, including construction, deployment, operation, and maintenance of a document structure extraction pipeline, or software components thereof, can be implemented according to disclosed technologies. The computing system 1100 is not intended to suggest any limitation as to scope of use or functionality of the present disclosure, as the innovations can be implemented in diverse general-purpose or special-purpose computing systems.

With reference to FIG. 11, computing environment 1110 includes one or more processing units 1122 and memory 1124. In FIG. 11, this basic configuration 1120 is included within a dashed line. Processing unit 1122 executes computer-executable instructions, such as for implementing any of the methods or objects described herein for extracting structured content of a document, or various other architectures, software components, handlers, managers, modules, or services described herein. Processing unit 1122 can be a general-purpose central processing unit (CPU), a processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store weights matrices; input, output, or intermediate records; named entity libraries; word embedding datasets; predefined document fields or a schema of such fields; other configuration data, data structures including data tables, working tables, change logs, output structures, data values, indices, or flags, as well as other operational data.

A computing system 1110 can have additional features, such as one or more of storage 1140, input devices 1150, output devices 1160, or communication ports 1170. An interconnection mechanism (not shown) such as a bus, controller, or network interconnects the hardware components of the computing environment 1110. Typically, operating system software (not shown) provides an operating environment for other software executing in the computing environment 1110, and coordinates activities of the hardware and software components of the computing environment 1110.

The tangible storage 1140 can be removable or non-removable, and includes magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein.

The input device(s) 1150 can be a mechanical, touch-sensing, or proximity-sensing input device such as a keyboard, mouse, pen, touchscreen, trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technologies are executed. Any combination of memory 1124, storage 1140, and computing cloud 1190 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 12:
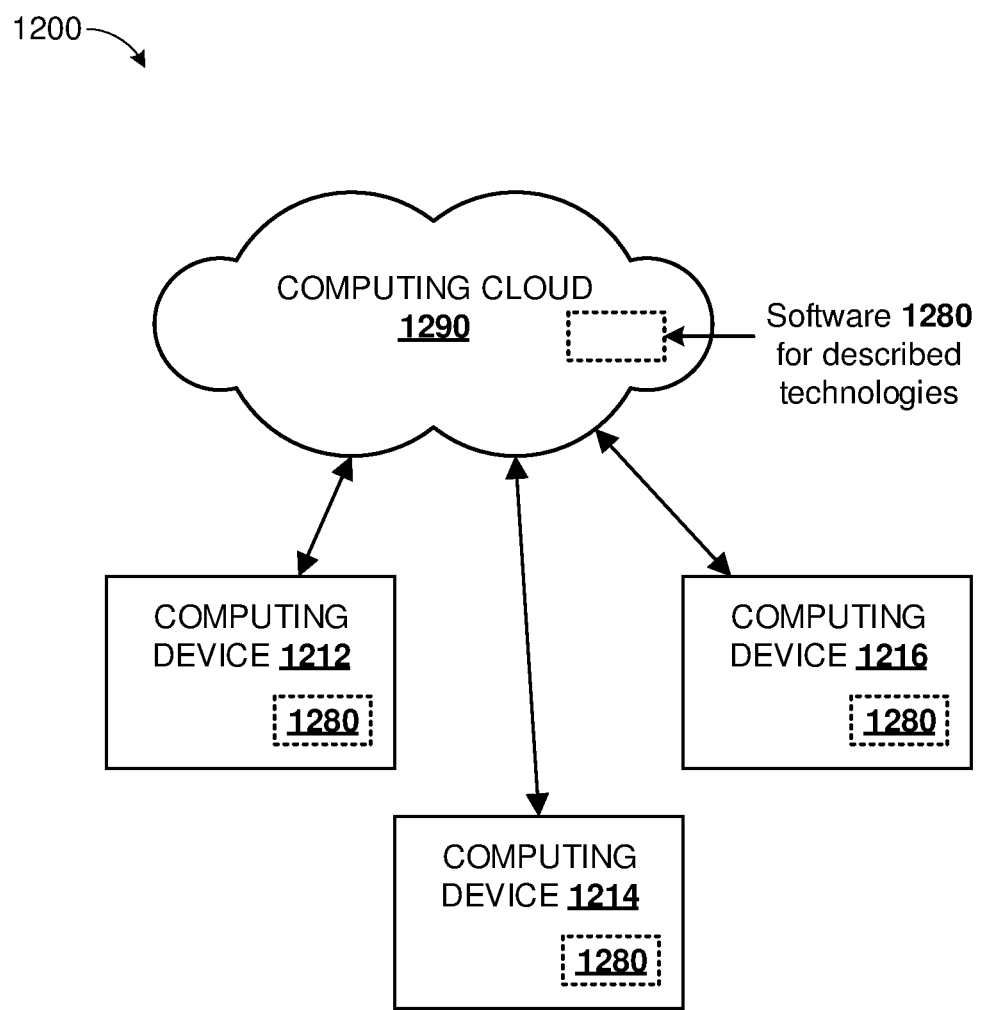
FIG. 12 is a diagram schematically depicting computing devices operating in conjunction with a computing cloud for implementation of disclosed technologies.

FIG. 12 depicts an example cloud computing environment 1200 in which the described technologies can be implemented. The cloud computing environment 1200 comprises a computing cloud 1290 containing resources and providing services. The computing cloud 1290 can comprise various types of cloud computing resources, such as computer servers, data storage repositories, networking resources, and so forth. The computing cloud 1290 can be centrally located (e.g., provided by a data center of a business or organization) or distributed (e.g., provided by various computing resources located at different locations, such as different data centers and/or located in different cities or countries).

The computing cloud 1290 can be operatively connected to various types of computing devices (e.g., client computing devices), such as computing devices 1212, 1214, and 1216, and can provide a range of computing services thereto. One or more of computing devices 1212, 1214, and 1216 can be computers (e.g., servers, virtual machines, embedded systems, desktop, or laptop computers), mobile devices (e.g., tablet computers, smartphones, or wearable appliances), or other types of computing devices. Communication links between computing cloud 1290 and computing devices 1212, 1214, and 1216 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1212, 1214, and 1216 can also be connected to each other.

Computing devices 1212, 1214, and 1216 can utilize the computing cloud 1290 to obtain computing services and perform computing operations (e.g., data processing, data storage, and the like). Particularly, software 1280 for performing the described innovative technologies can be resident or executed in the computing cloud 1290, in computing devices 1212, 1214, and 1216, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "add," "aggregate," "analyze," "append," "apply," "calculate," "call," "classify," "combine," "compose," "compute," "concatenate," "configure," "consolidate," "construct," "decode," "derive," "determine," "display," "embed," "encode," "evaluate," "execute," "extract," "form," "generate," "group," "identify," "incorporate," "input," "join," "label," "learn," "link," "list," "loop," "map," "match,"

"merge," "normalize," "obtain," "output," "perform," "populate," "predict," "preprocess," "process," "provide," "receive," "recognize," "remove," "replace," "request," "return," "retrieve," "select," "send," "set," "store," "tag," "test," "train," "transform," "transmit," or "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The term computer-readable storage media does not include signals and carrier waves. In addition, the term computer-readable storage media does not include communication ports (e.g., 1170) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. One or more computer-readable media storing instructions which, when executed by one or more hardware processors, cause the one or more hardware processors to perform operations for extracting a graph structure of a text document, the operations comprising:
   preprocessing the text document to generate an initial input record comprising a sequence of input vectors representing respective tokens of the text document;
   at each of a plurality of levels, processing a respective input record with a respective neural network to generate a portion of the graph structure at the each level, wherein the input record at an initial level of the levels is the initial input record;
   for each level of the levels, except the initial level, deriving the respective input record from:
   the input record for an immediately preceding level of the levels; and
   the portion of the graph structure generated at the immediately preceding level; and
   outputting the graph structure.

2. The one or more computer-readable media of claim 1, wherein the preprocessing comprises:
   recognizing at least one field in the text document as a named entity; and
   replacing the at least one field in the text document with the named entity.

3. The one or more computer-readable media of claim 1, the generating the initial input record comprises:
   tagging the record with positional encoding information of a plurality of the tokens.

4. The one or more computer-readable media of claim 1, wherein edges of the graph structure comprise:
   a first directed edge indicating a key-value relationship between a first pair of the tokens; and
   a second undirected edge indicating a peer relationship between a second pair of the tokens.

5. The one or more computer-readable media of claim 1, wherein edges of the graph structure comprise three or more undirected edges forming a cycle.

6. The one or more computer-readable media of claim 1, wherein the deriving the input record for the each level further comprises:
   identifying a composite token representing a plurality of the tokens based on the portion of the graph structure generated at the immediately preceding level; and
   replacing, in the input record for the immediately preceding level, the plurality of the tokens with the composite token to obtain the input record for the each level.

7. The one or more computer-readable media of claim 1, wherein the operations further comprise:
   merging the respective portions of the graph structure for the plurality of levels to form a multi-level graph of the text document.

8. The one or more computer-readable media of claim 1, wherein the operations further comprise:
   mapping a plurality of vertices of the structure to respective columns of a database;
   adding one or more records to the database for the text document; and
   for each of the mapped vertices, storing a value representing content of the text document in the respective column of the added one or more records.

9. The one or more computer-readable media of claim 1, wherein the text document is an input text document, the operations are first operations to be performed at run time, and the instructions, when executed by the one or more hardware processors at training time, perform second operations comprising:
   obtaining a plurality of training records for respective training text documents, each of the training records having one or more input features representing unstructured content of the respective training text document and having, as training labels, one or more training graphs describing relationships among the unstructured content of the respective training text document; and
   training, for at least a given level of the levels, the respective neural network on the training records.

10. The one or more computer-readable media of claim 9, wherein the one or more training graphs describe a hierarchy of relationships among two or more levels of entities of the respective training text document.

11. The one or more computer-readable media of claim 10, wherein the training comprises:
    applying a first loss function to train the respective neural network of the given level to identify relationships at the given level; and
    applying a second loss function distinct from the first loss function to train the respective neural network of a second level, of the levels, to identify relationships at the second level.

12. A computer-implemented method for extracting a graph structure of a text document, the method comprising:
    preprocessing the text document to generate an initial input record comprising a sequence of input vectors representing respective tokens of the text document;
    at each of a plurality of levels, processing a respective input record with a respective neural network to generate a portion of the graph structure at the each level, wherein the input record at an initial level of the levels is the initial input record;
    for each level of the levels, except the initial level, deriving the respective input record from:
       the input record for an immediately preceding level of the levels; and
       the portion of the graph structure generated at the immediately preceding level; and
    outputting the graph structure.

13. The computer-implemented method of claim 12, wherein the graph structure comprises multiple vertices, each of the vertices represents a single one of the tokens or a group of related ones of the tokens, and each edge of the graph structure represents a relation between a pair of the vertices joined by the each edge, the represented token(s) defining a value.

14. The computer-implemented method of claim 13, further comprising:
    adding a record to a database table for the text document;
    for each of a plurality of the vertices of the graph structure:
       identifying a column of the database table; and
       storing, in the record, at the column, the value defined by the token(s) represented by the each vertex.

15. The computer-implemented method of claim 12, wherein an output of the respective neural network, at a given level of the levels, comprises a sequence of output vectors for respective ones of the tokens;
    wherein components of each of the output vectors identify relationships between:
       the respective token of the each output vector; and
       the respective tokens of others of the output vectors;
    wherein the sequence of output vectors defines the portion of the graph structure at the given level.

16. The computer-implemented method of claim 12, wherein:
    a first level of the levels immediately precedes a second level of the levels;
    the portion of the graph structure defined at the first level comprises an edge joining first and second vertices of the graph structure, the first and second vertices respectively representing a first token and a second token of the tokens; and
    the deriving the input record for the second level comprises incorporating a union vector representing a union of the first and second tokens into the derived input record.

17. A system comprising:
    one or more hardware processors with memory coupled thereto and one or more network interfaces;
    computer-readable media storing instructions which, when executed by the one or more hardware processors, cause the hardware processors to perform operations for extracting a graph structure of a text document, the operations comprising:
       preprocessing the text document to generate an initial input record comprising a sequence of input vectors representing respective tokens of the text document;
       at each of a plurality of levels, processing a respective input record with a respective neural network to generate a portion of the graph structure at the each level, wherein the input record at an initial level of the levels is the initial input record;
       for each level of the levels, except the initial level, deriving the respective input record from:

the input record for an immediately preceding level of the levels; and the portion of the graph structure generated at the immediately preceding level; and outputting the graph structure.

18. The system of claim 17, wherein:

the graph structure comprises a plurality of vertices having respective values defined by content of the text document;

the system further comprises a database management system storing a database; and the operations further comprise:

mapping the vertices to columns of the database; and for each of the vertices, storing the respective value of the each vertex in the database.

19. The system of claim 17, wherein the respective neural network at a given level of the levels comprises a transformer neural network.

20. The system of claim 19, wherein the transformer neural network is configured to receive inputs representing a number N of tokens of the text document and to generate outputs representing $N \cdot (N-1)/2$ pairwise combinations of the N tokens, wherein one or more of the outputs define edges of the graph structure.

* * * * *